United States Patent [19]
Shibata

[11] Patent Number: 5,315,438
[45] Date of Patent: May 24, 1994

[54] ZOOM LENS SYSTEM

[75] Inventor: Hironori Shibata, Tokyo, Japan

[73] Assignee: Olympus Optical Co., Ltd., Tokyo, Japan

[21] Appl. No.: 806,127

[22] Filed: Dec. 12, 1991

[30] Foreign Application Priority Data

Dec. 12, 1990 [JP] Japan ................. 2-401563
Dec. 26, 1990 [JP] Japan ................. 2-406529

[51] Int. Cl.$^5$ .......................................... G02B 15/14
[52] U.S. Cl. ................................. 359/687; 359/685
[58] Field of Search ........ 359/687, 676, 683, 684–686, 359/694

[56] References Cited

U.S. PATENT DOCUMENTS

| | | | |
|---|---|---|---|
| 4,789,226 | 12/1988 | Ogata ........................ | 359/687 |
| 5,000,551 | 3/1991 | Shibayama ................. | 359/687 |
| 5,032,013 | 7/1991 | Shibayama ................. | 359/687 |
| 5,179,472 | 1/1993 | Ohno et al. ................ | 359/687 |

Primary Examiner—Loha Ben
Assistant Examiner—James Phan
Attorney, Agent, or Firm—Cushman, Darby & Cushman

[57] ABSTRACT

A zoom lens system having a field angle of about 44° to 47° at the wide angle end, a zoom ratio of about 2.6 to 3 and an F-number on the order of 2.8, which is reduced in value while making sure of a back focus and which is improved in terms of its capability to form images. The zoom lens system includes, in order from the object side, a first lens group having a positive refractive power, a second lens group having a negative refractive power, a third lens group having a positive refractive power and a fourth lens group consisting of three lens elements and having a positive refractive power as a whole, the second and third lens groups being movable for zooming.

22 Claims, 17 Drawing Sheets

ZOOM LENS SYSTEM

BACKGROUND OF THE INVENTION

This invention relates to a small-sized zoom lens system lending itself well fit for electronic still, video and other cameras using solid state image sensors, etc. as the image pickup devices.

In recent years, radical reductions in the size and weight of electronic still and video cameras have been in the making. Solid state image sensors are now decreasing in size from ½ in. or a diagonal length of ca. 8 mm to ⅓ in. or a diagonal length of ca. 6 mm and further to ¼ in. or a diagonal length of ca. 4 mm, with an increasing demand for reductions in the size of corresponding lens systems. Conventional lens systems which are designed to achieve such size and weight reductions and belong in type to that of the invention to be described later are set forth in Japanese Provisional Patent Publications Nos. 2(1990)-236514 and 64 (1989)-91110, for instance. These systems make sure of sufficient back focal distances because of using prism half or quick return mirrors as means for splitting rays to a finder optical system. As described in Example 10 of the latter publication teaching the shortest total length, however, the total length is still as long as expressed by $$\text{Total length}/f_W > 4.46$$

wherein the total length is the distance from the first surface to the final surface of the lens system and $f_W$ fill is the focal length of the total system at the wide angle end. Thus, there is left much to be desired in connection with size reductions. When lens systems are scaled down according to a certain proportionality factor to accommodate to image pickup sensors of ⅓ in. or ¼ in. in size, some problems arise in the course of processing lenses; for instance, the edge and intermediate thicknesses of convex and concave lenses become insufficient.

SUMMARY OF THE INVENTION

Having been accomplished so as to eliminate the defect of the above conventional zoom lens systems designed for electronic image pickup devices and having a zoom ratio on the order of 3 that its total length is too long, this invention seeks to provide a zoom lens system which ensures sufficient edge and intermediate thicknesses even when it is applied to an image pickup sensor of smaller size, has a field angle of about 4° to 47° at the wide angle end, a variable power ratio of about 1.6 to 3 and an F-number on the order of 2.8, is reduced in size while making sure of a sufficient back focus and is capable of forming images well.

According to one aspect of this invention in order to solve the above problems, there is provided a zoom lens system characterized by consisting of, in order from the object side, a first lens group having a positive refractive power, a second lens group having a negative refractive power, a third lens group having a positive refractive power and a fourth lens group consisting of three lens elements and having a positive lens group as a whole, said second and third lens groups being moved in zooming thereby performing variable power and said zoom lens system satisfying the following condition (1):

$$0.1 < (r_{4lF} + r_{4lR})/(r_{4lF} - r_{4lR}) < 3.0 \tag{1}$$

wherein $r_{4lF}$ is the radius of curvature of the front surface of the lens in the fourth lens group that is proximate to the object side and $r_{4lR}$ is the radius of curvature of the rear surface of the lens in the fourth lens group that is proximate to the object side.

According to another aspect of this invention, there is provided a zoom lens system characterized by consisting of, in order from the object side, a first lens group having a positive refractive power, a second lens group having a negative refractive power, a third lens group having a positive refractive power and a fourth lens group consisting of three lens elements and having a positive lens group as a whole, said second and third lens groups being moved in zooming thereby performing variable power and said zoom lens system satisfying the following condition (2):

$$0.5 < f_{IV}/f_W < 1.2 \tag{2}$$

wherein $f_{IV}$ is the focal length of the fourth lens group and $f_W$ is the focal length of the total system at the wide angle end.

According to the third aspect of this invention, there is provided a zoom lens system characterized by consisting of, in order from the object side, a first lens group having a positive refractive power, a second lens group having a negative refractive power, a third lens group having a positive refractive power and a fourth lens group consisting of three lens elements and having a positive lens group as a whole, said second and third lens groups being moved in zooming thereby performing variable power and said zoom lens system satisfying the following condition (3):

$$0.4 < \Sigma d_{IV}/f_W < 1.12 \tag{3}$$

wherein $\Sigma d_{IV}$ is the total thickness of the forth lens group from the first surface to the final surface and $f_W$ is the focal length of the total system at the wide angle end.

It is desired that the first and third lens systems should further satisfy the following conditions (4) and (5):

$$-2.5 < (r_{42F} + r_{42R})/(r_{42F} - r_{42R}) < -0.5 \tag{4}$$

$$-5 < (r_{31F} + r_{31R})/(r_{31F} - r_{31R}) < -1.1 \tag{5}$$

wherein $r_{42F}$ is the radius of curvature of the front surface of the lens lying intermediate in the fourth lens group, $r_{42R}$ is the radius of curvature of the rear surface of the lens lying intermediate in the fourth lens group, $r_{31F}$ is the radius of curvature of the surface of the third lens group that lies on the object side and $r_{31R}$ is the radius of curvature of the surface of the third lens group that lies on the image side.

It is also desired that the second and third lens systems should further satisfy the following condition (6):

$$1 < (r_{42F} + r_{42R})/(r_{42F} - r_{42R}) < 5 \tag{6}$$

wherein $r_{42F}$ is the radius of curvature of the front surface of the lens lying intermediate in the fourth lens group, and $r_{42R}$ is the radius of curvature of the rear surface of the lens lying intermediate in the fourth lens group.

Still further, it is desired that the above zoom lens systems should all satisfy the following condition (7):

$$2.4 < f_{III}/f_W < 4.15 \tag{7}$$

wherein $f_{III}$ is the focal length of the third lens group and $f_W$ is the focal length of the total system at the wide angle end.

In connection with each of the above zoom lens systems, it is noted that the fourth lens groups should preferably consist of three lens elements, i.e., positive, negative and positive lens elements in order from the object side.

As described above, this invention provides several types of zoom lens systems, each consisting of, in order from the object side, a first lens group having a positive refractive power, a second lens group having a negative refractive power, a third lens group having a positive refractive power and a fourth lens group consisting of three lens elements and having a positive lens group as a whole, said second and third lens groups being moved in zooming to perform variable power. In order to reduce the number of the lens elements and the total lengths of the zoom lens systems, it is preferred that the second and third lens groups should be moved in the same direction along the optical axis, while their relative space is varied, thereby performing zooming and correcting images for their positions.

Incidentally, reducing the total length of a zoom lens system may be achievable by increasing the refractive powers of the respective lens groups, as carried out so far in the art. However, this technique has its own limit, because especially when it is applied to a lens system of small size, its radius of curvature is so likely to decrease that difficulty would be encountered in making sure of the edge thickness of a convex lens, the space between it and a lens proximate thereto, etc.

For this reason, it is contemplated in this invention to reduce the total length of a zoom lens system by elaborating on the geometry of the fourth lens group. In order to obtain a lens system which is reduced in the total length with well-corrected various aberrations, while allowing it to have a sufficient back focus, Condition (1) must be met.

Condition (1) gives a definition to the shape of the lens of the fourth lens group that is proximate to the object side. Within the range defined by Condition (1) or, in a more illustrative term, by making the radius of curvature of the image-side surface of the lens of the fourth lens group that is proximate to the object side smaller than that of the object-side surface thereof, it is possible to reduce the amounts of spherical and off-axial aberrations occurring with respect to marginal rays which pass through the first to third lens groups and are incident in the form of slightly divergent rays and off-axial rays incident at large angles with respect to the optical axis, as compared with when the radius of curvature of the object-side lens is reduced while the same focal length is maintained. Within the range defined by Condition (1), it is also possible to locate the principal point position of the total system of the fourth lens group in the vicinity of the image surface, thereby increasing the back focus even in the same focal length.

However, exceeding the upper limit of Condition (1) is unpreferred, in part because it is hard to increase the positive refractive power, so that the Petzval's sum is likely to increase and in part because the forth lens group is less capable of preventing divergence of a bundle of off-axial rays, so that the rays strike on the second and third lens elements of the fourth lens group at high positions. Falling short of the lower limit is again unpreferred, because the radius of curvature of the lens surface on the object side is so decreased that it is difficult to make sure of its edge thickness; this requires to increase its intermediate thickness and so has a retrogressive effect on permitting the present system to have a sufficient back focus and decrease in size.

According to this invention, an optical system without recourse to such reflecting members as quick return or prism half mirrors is interposed between the final surface of the lens and the image surface as means for reducing the total length (the distance from the first surface of the lens to the image surface), thus enabling the back focus to be reduced mechanically. By satisfying the above condition (2), it is possible to increase the refractive power of the fourth lens group and enhance the degree of convergence of rays, thereby reducing the back focus actually. At higher than the upper limit of Condition (2), however, the power of the fourth lens group is so weak that difficulty is involved in reducing the back focus and so the total length. At less than the lower limit, the radius of curvature of the lens surface must be diminished to increase the refractive power, so that the amounts of spherical, off-axial and other aberrations occurring are too large for correction.

The above condition (3) gives a definition to the total thickness of the fourth lens group with respect to the focal length of the total system at the wide angle end, and represents how much the fourth lens group should be made compact. In the fourth lens group, the radius of curvature of the image-side surface of the first lens element is made small, as defined by Condition (1), and the radius of curvature of the second lens on the object side is made small as well, thereby making up for aberrations occurring there. In order to compensate for high-order aberrations occurring with respect to each other, it is required to narrow the space between these lens elements, thereby enabling the total thickness of the fourth lens group and hence the total length of the total system to be reduced.

When the total length is shorter than that defined by the lower limit of Condition (3), however, it is difficult to make sure of the intermediate thickness of the concave lens element and the edge thicknesses of the convex lens elements. Above the upper limit, on the other hand, difficulty is involved in reducing the total length of the total system.

By elaborating on the geometry of the fourth lens group as described above, it is possible to make the total length shorter and the capability to form images better than would be possible with the prior art. However, more advantageous results would be obtained, if the number of the lens elements of the first to third lens groups is reduced as much as possible. This is because, in lens systems for image pickup elements of particularly small size, the thicknesses of the lenses account for a considerable proportion of the total lengths thereof.

Further, it is desired that the present system should satisfy the above condition (4) in addition to the above conditions (1) and (3). Condition (4) gives a definition to the shape of the second lens of the fourth lens group. Within the range defined by Condition (4), the second lens serves well to locate the principal point position of the fourth lens group in the vicinity of the image surface, as with Condition (1), enabling the present system to have a sufficient back focus. Also, since the object-side surface having a small radius of curvature stands opposite to the image-side surface, having a small radius of curvature, of the first lens element of the fourth lens group, it is possible to compensate for high-order aberrations in particular.

Falling short of the lower limit of Condition (4), however, is unpreferred, because the second lens takes a negative meniscus shape having a small radius of curvature, making the amount of positive spherical aberration too large for correction. Even though this is corrected, there would be a decrease in the radius of curvature somewhere in other lens elements, making it difficult to ensure its edge thickness. Exceeding the upper limit is again unpreferred, because the second lens does not well serve to locate the principal point position of the fourth lens group in the vicinity of the image side.

In the case of a zoom lens system, chromatic aberration variations pose a problem during zooming; it is required for the respective lens groups to play an achromatic role to a certain extent. In the present zoom lens system, however, achromatization takes place through the second and third lens groups which are considered as a single group in this invention; in other words, the total number of the lens elements in the first and second+third lens groups may be $2+(1+1)=4$. It is noted, however, that more advantageous for aberration correction is that the total number of the lens elements in the second+third lens groups is $2+1=3$. This is because as the total system decreases in length, the respective lens groups increase in their refractive powers with decreases in their radii of curvature, ending up with increases in the amount of aberration produced and so in the amount of their displacement during zooming.

Thus, it is preferred that the total lens system be made up of eight lens elements in all, i.e., 2 (for the 1st lens group)+2 (for the 2nd lens group)+1 (for the 3rd lens group)+3 (for the 4th lens group), smaller than required for conventional image-forming systems. More desirous is that the above condition (5) be satisfied, because various aberrations can be well corrected while reducing the total length of the system.

The above condition (5) gives a definition to the shape of the single lens forming the third lens group. This definition is essential when a stop is interposed between the third and fourth lens groups, especially because the geometry of the lens system at the telephoto end is made substantially symmetrical around that stop, thereby enabling various aberrations to be greatly compensated for. Below the lower limit of that condition, the single lens is likely to take a meniscus form having a radius of curvature so small that the amount of negative spherical aberration generated would be too large for correction, whereas above the upper limit some difficulty is rather involved in making correction on positive spherical aberration.

It is understood that when the above condition (2) or (3) is satisfied, the above condition (6) may be satisfied in place of the above condition (4). Condition (6) gives a definition to the shape of the second lens element of the fourth lens group. In other words, if the radius of curvature of the image-side surface of the second lens is made smaller than that of the object-side surface thereof and the overall principal point position of the fourth lens group is shifted toward the object side, then the back focus can be reduced while the same refractive power is maintained. Above the upper limit of that condition, however, the second lens is likely to take a meniscus form having a radius of curvature so small that the amount of negative spherical aberration in particular would be too large for correction, whereas below the lower limit it is not achieved to reduce the back focus.

As already stated, the less the number of lens elements in the 1st, 2nd and 3rd lens groups, the more favorably is it achieved to reduce the size of a zoom lens system. In consideration of achromatization, however, the first lens group is made up of two lens elements. The second and third lens groups play an achromatic role in the form of a single group, but in view of the fact that changes in the space between them give rise to aberration variations, it is desired that they be made up of two or three lens elements in all. More preferable for aberration correction is that the lens elements of the 3rd lens group satisfy the above condition (7).

Concerning the focal length of the third lens group, Inequality (7) provides the condition required for rays to strike on the fourth lens group at a suitable height and angle. The third lens group should not exceed the upper limit of Condition (7) in order to prevent divergence of the light from the second lens group having a power increased to make sure of zoom magnifications while reducing the total length of the zoom lens system, and falling short of the lower limit is unpreferred, particularly because of giving rise to an increase in the positive Petzval's sum and the degradation of contrast around an image pickup sensor due to the fact that the combined negative refractive power of the first to third lens group is weak.

In this invention, an aspherical surface whose positive refractive power decreases gradually from its center to its periphery are further applied to any surface of the combined second and third lens groups or the fourth lens group, whereby various aberrations can be more favorably corrected.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
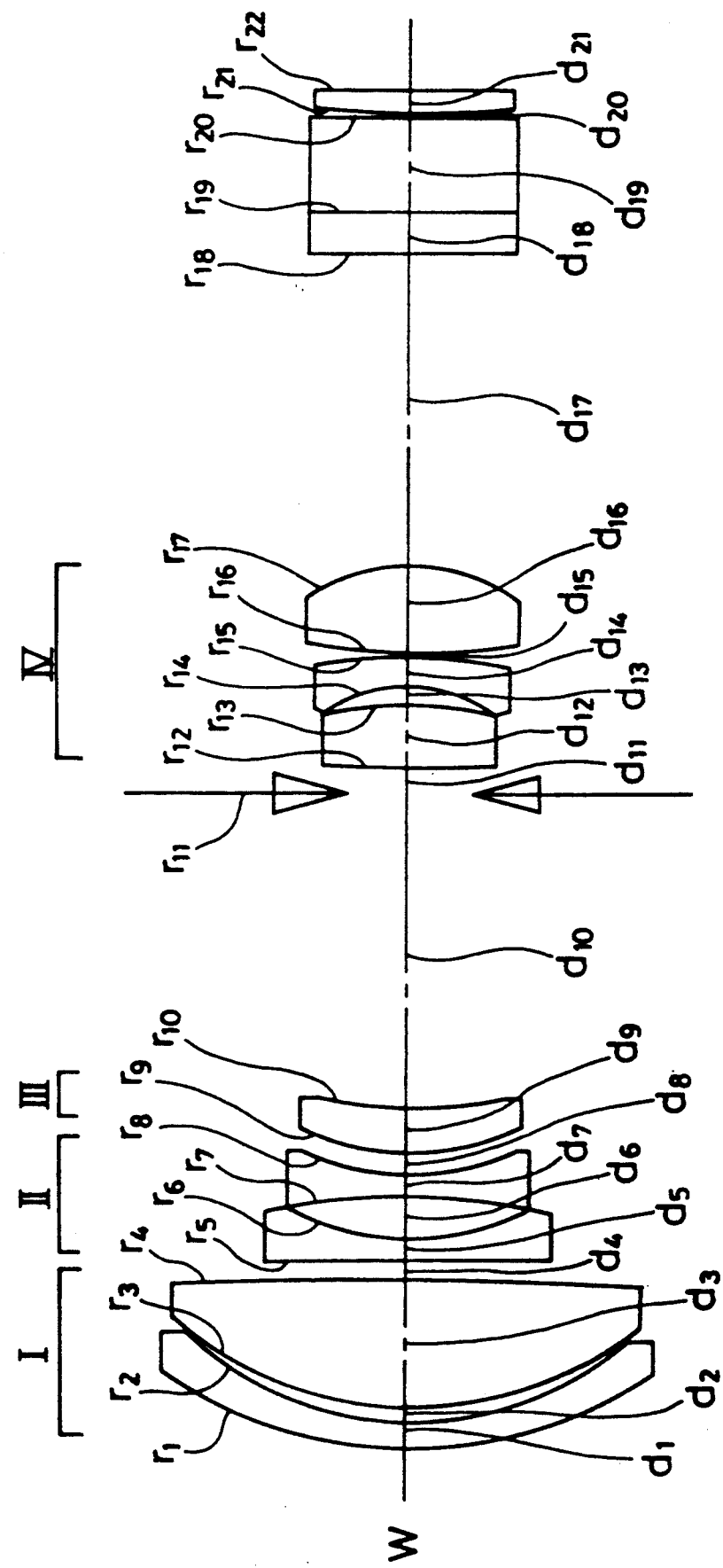
FIG. 1 is a sectional view of the lens system according to Example I at the wide angle end.
Figure 2:
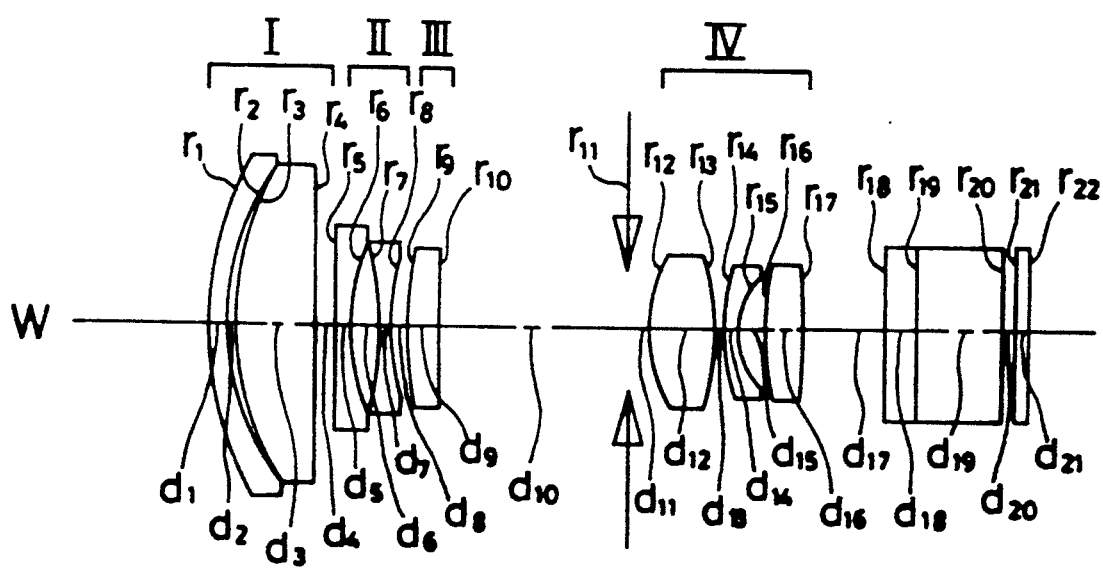
FIGS. 2 to 7 are sectional views of the lens systems according to Examples 8 to 13 at the wide angle ends.
Figure 3:
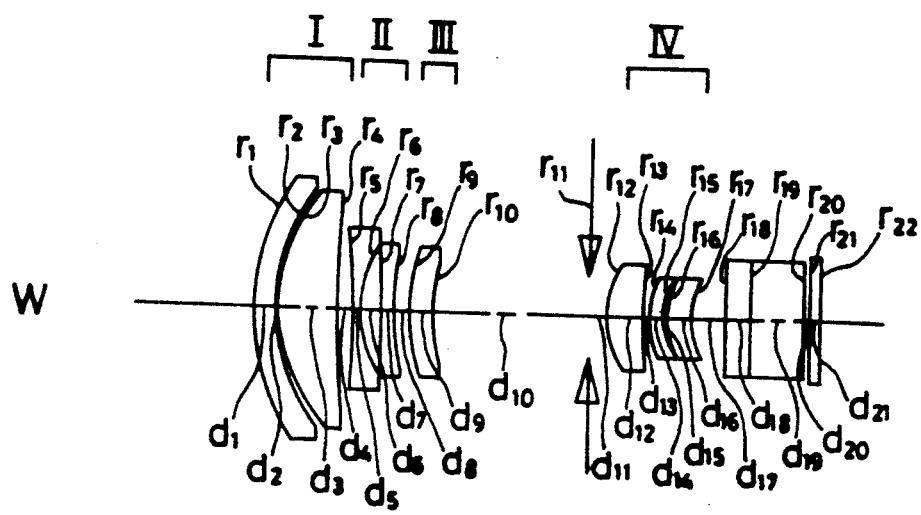
Figure 4:
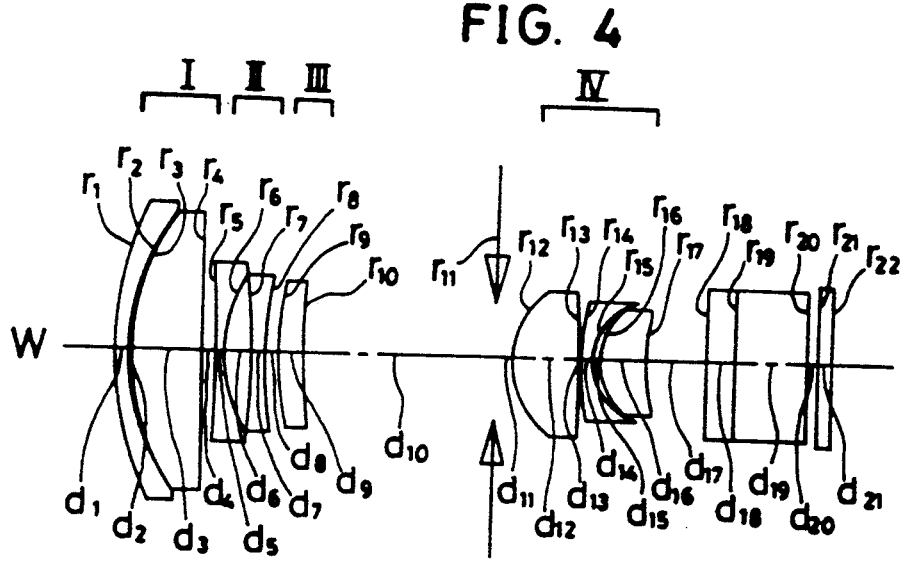
Figure 5:
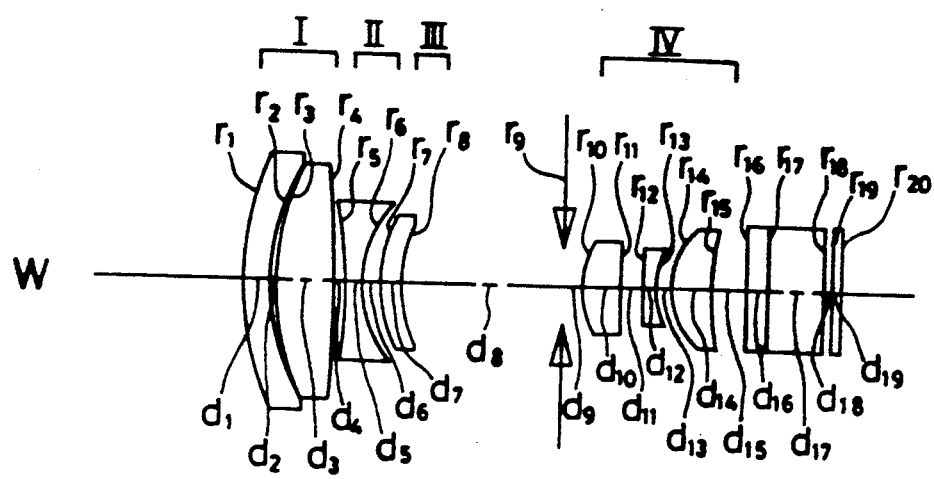
Figure 6:
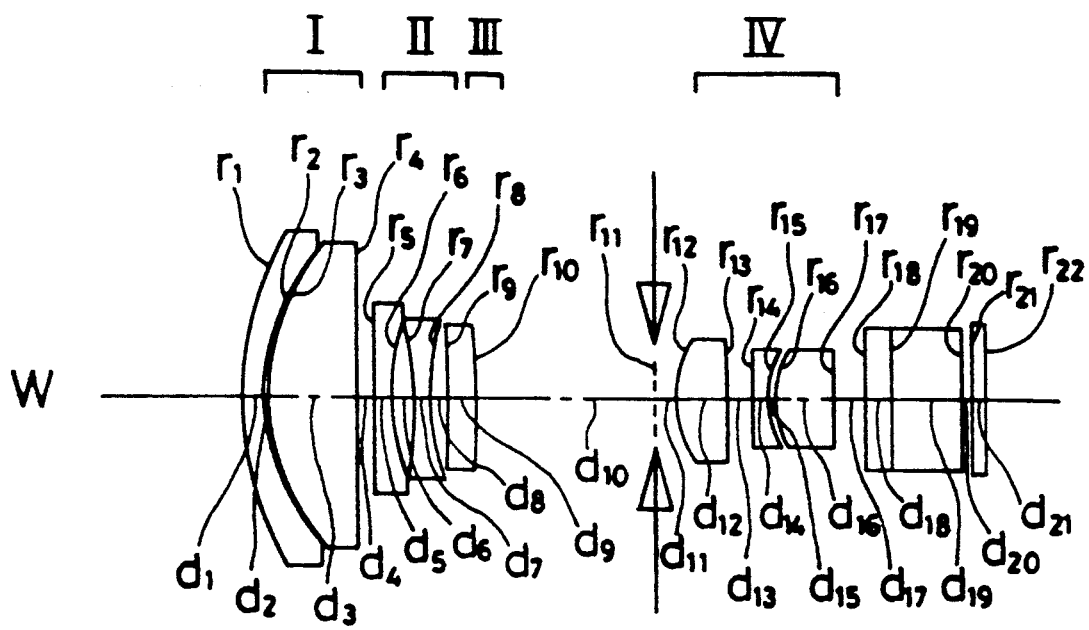
Figure 7:
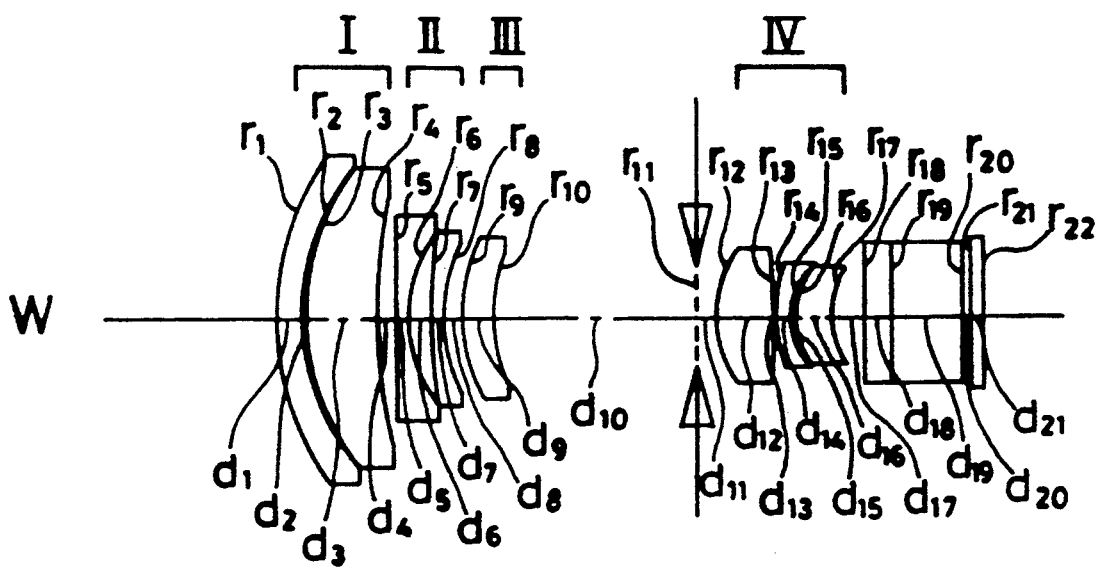
Figure 8:
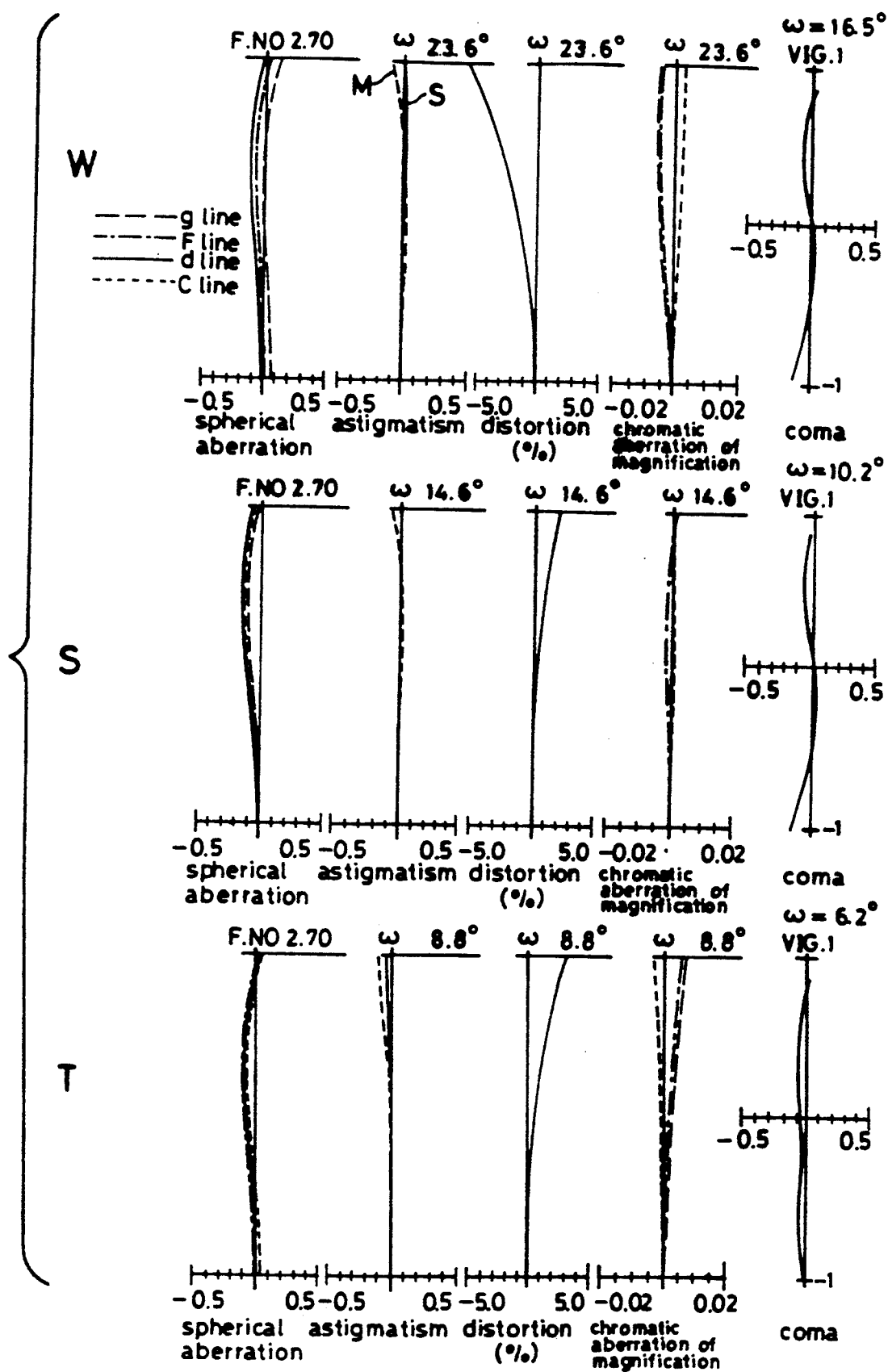
FIGS. 8 to 20 are aberration curve diagrams of Examples 1 to 13 at the wide angle ends (W), standard settings (S) and telephoto ends (T).
Figure 9:
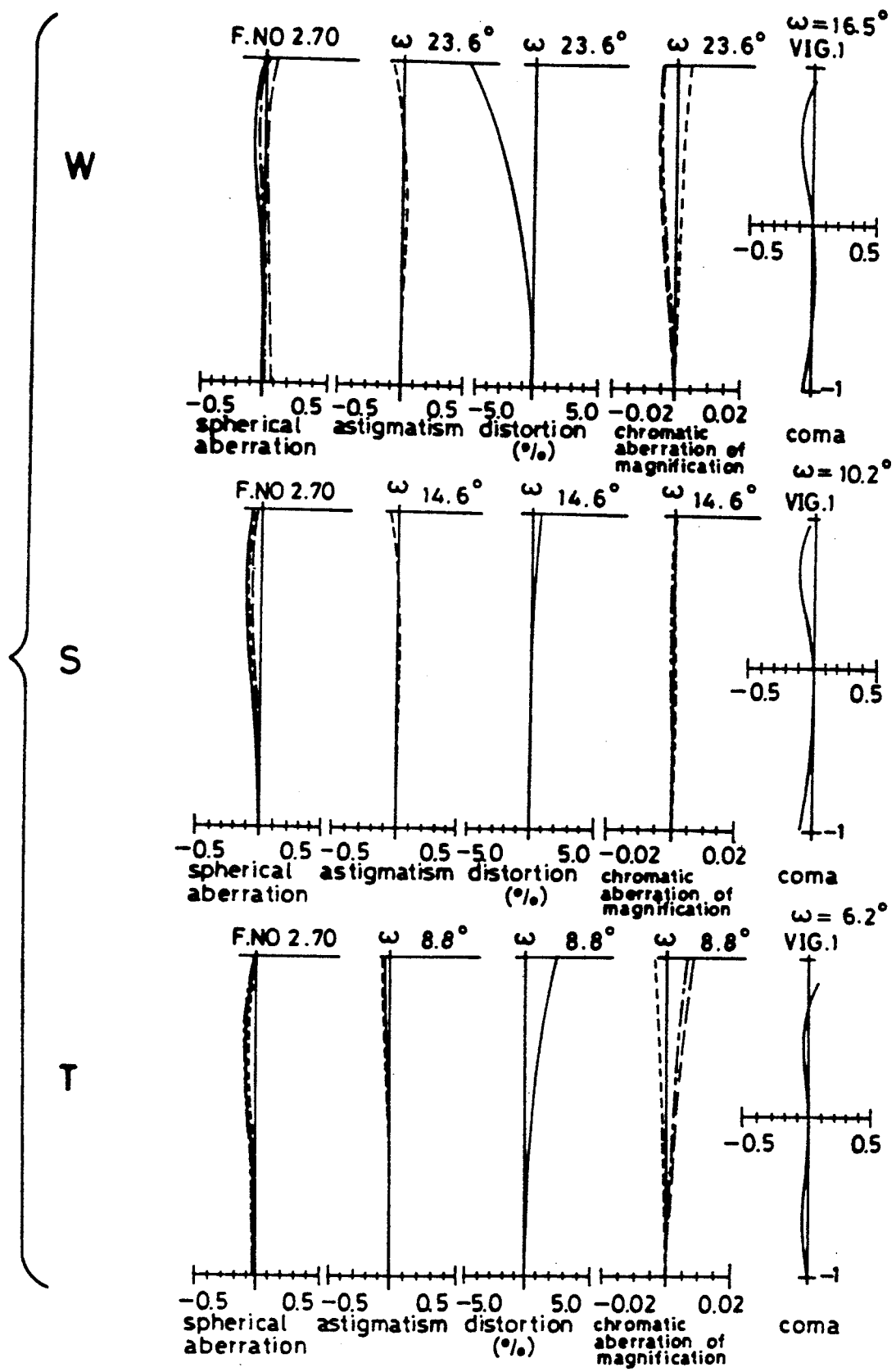
Figure 10:
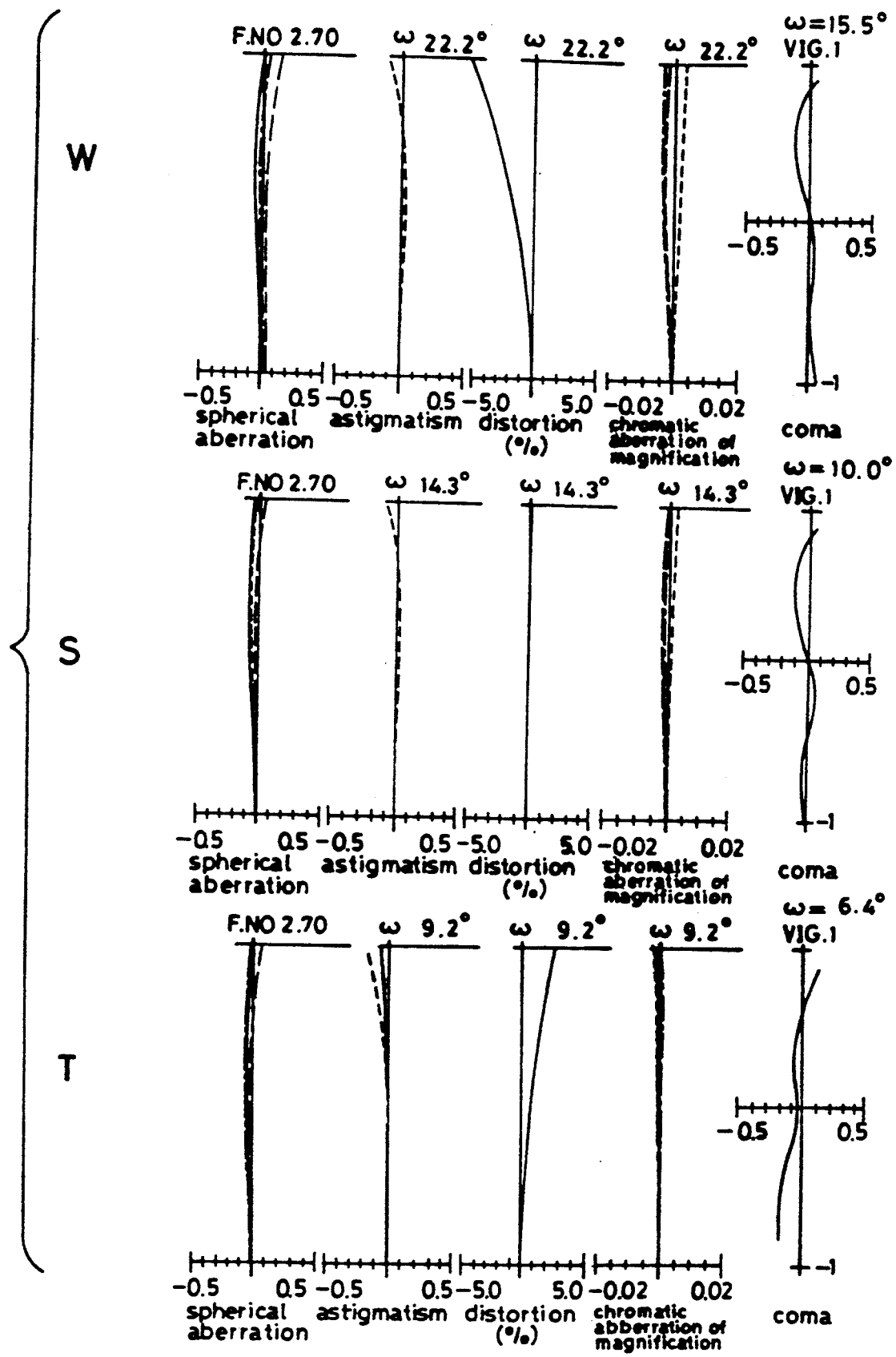
Figure 11:
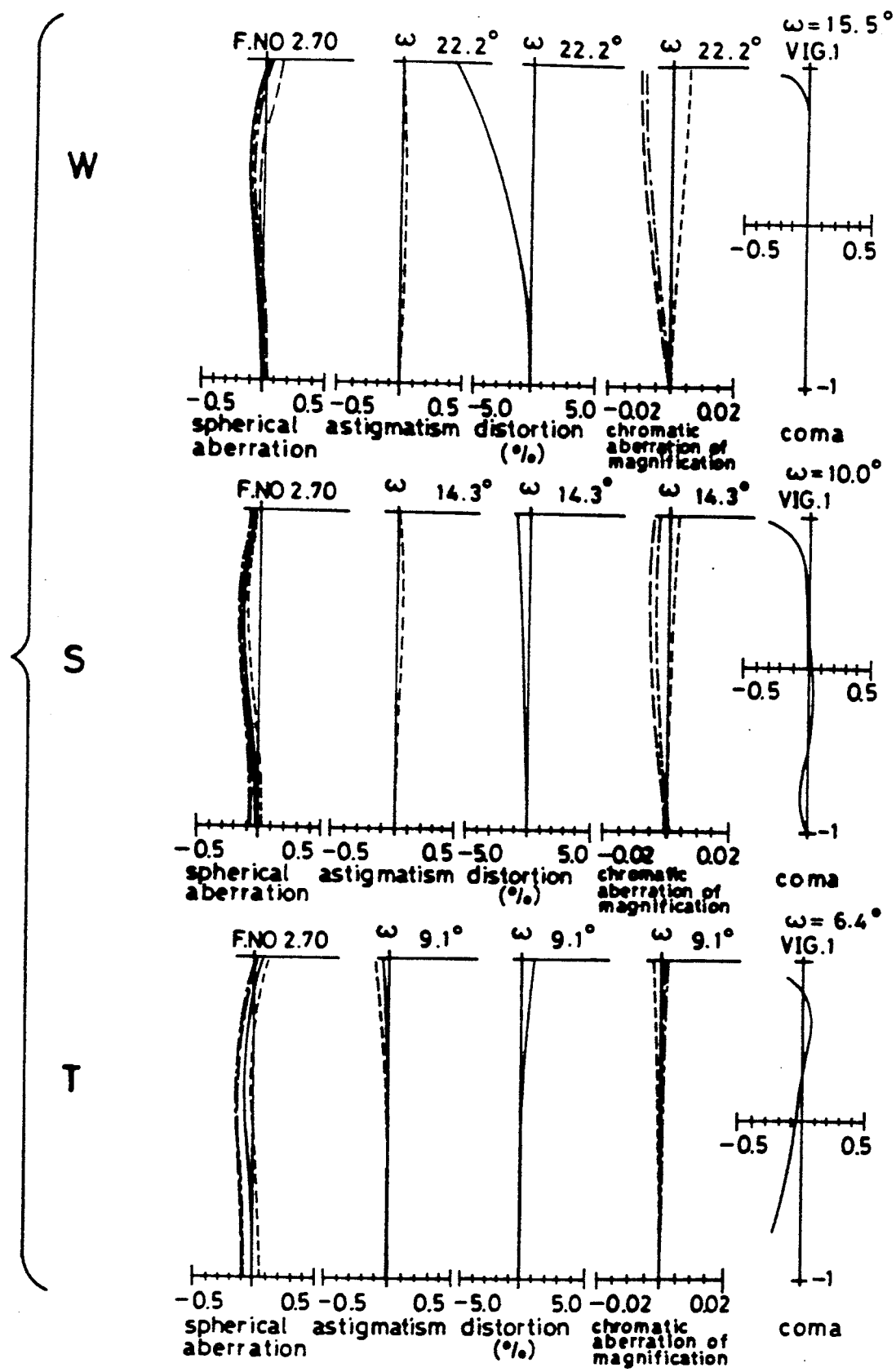
Figure 12:
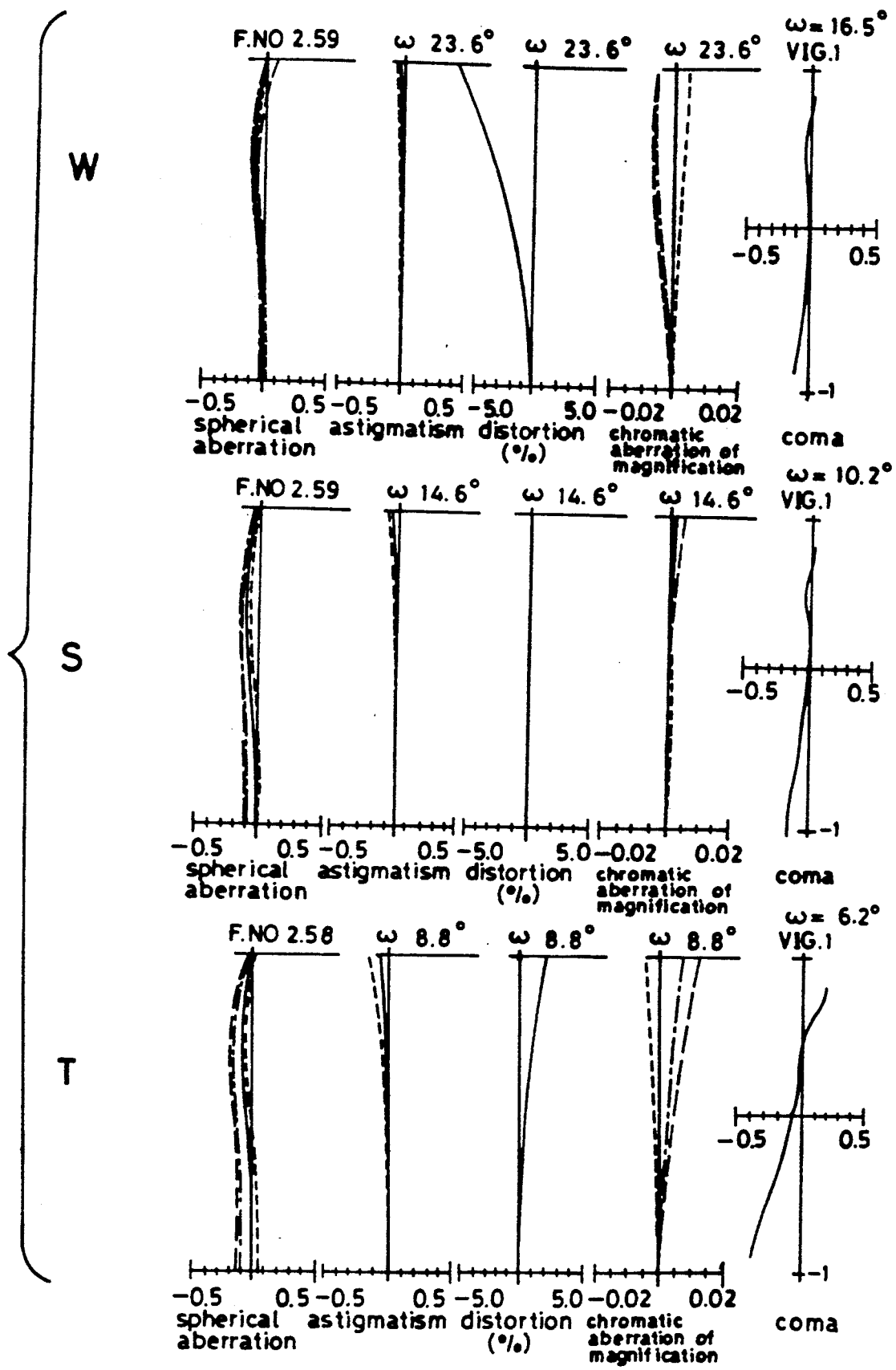
Figure 13:
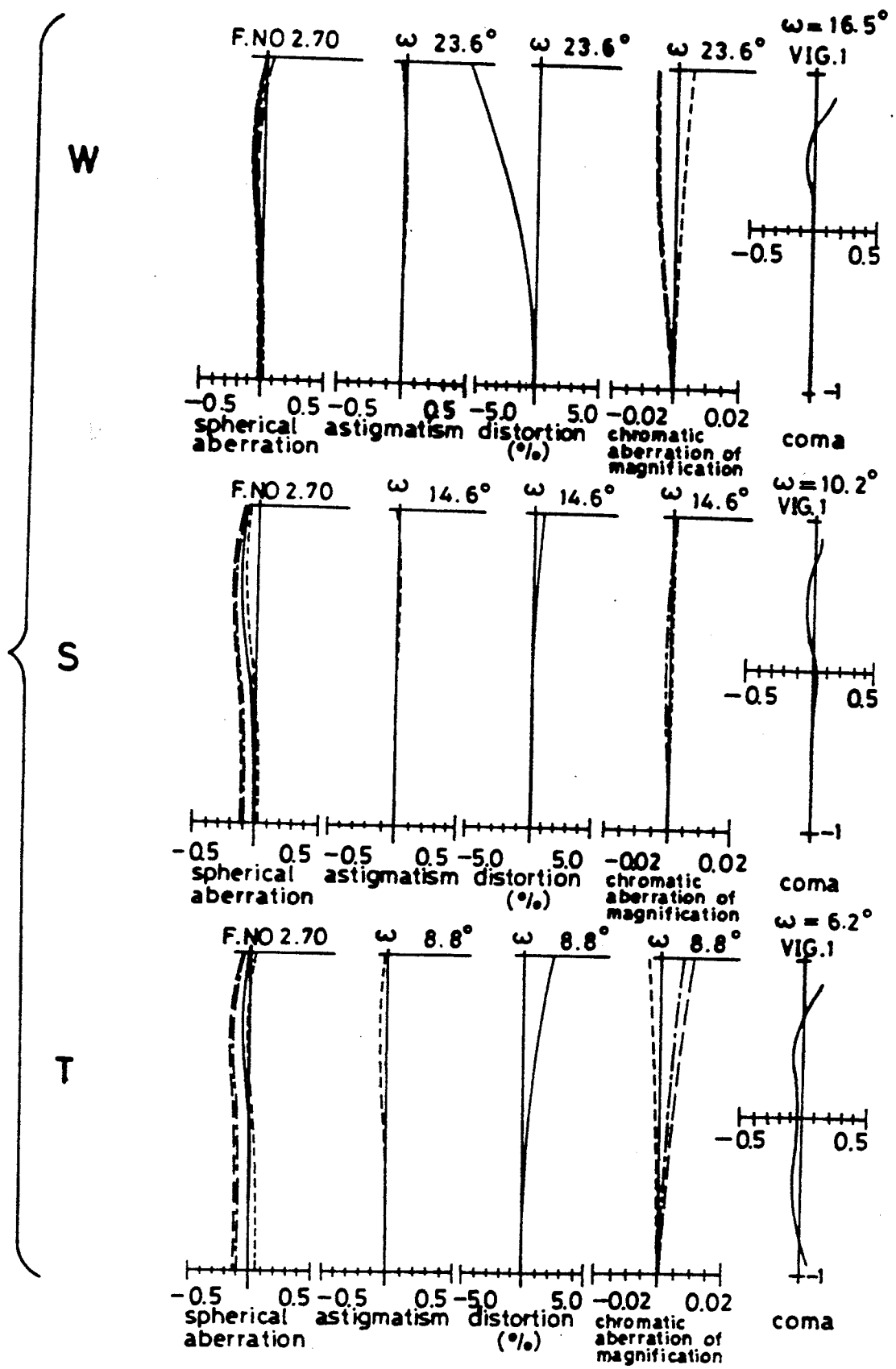
Figure 14:
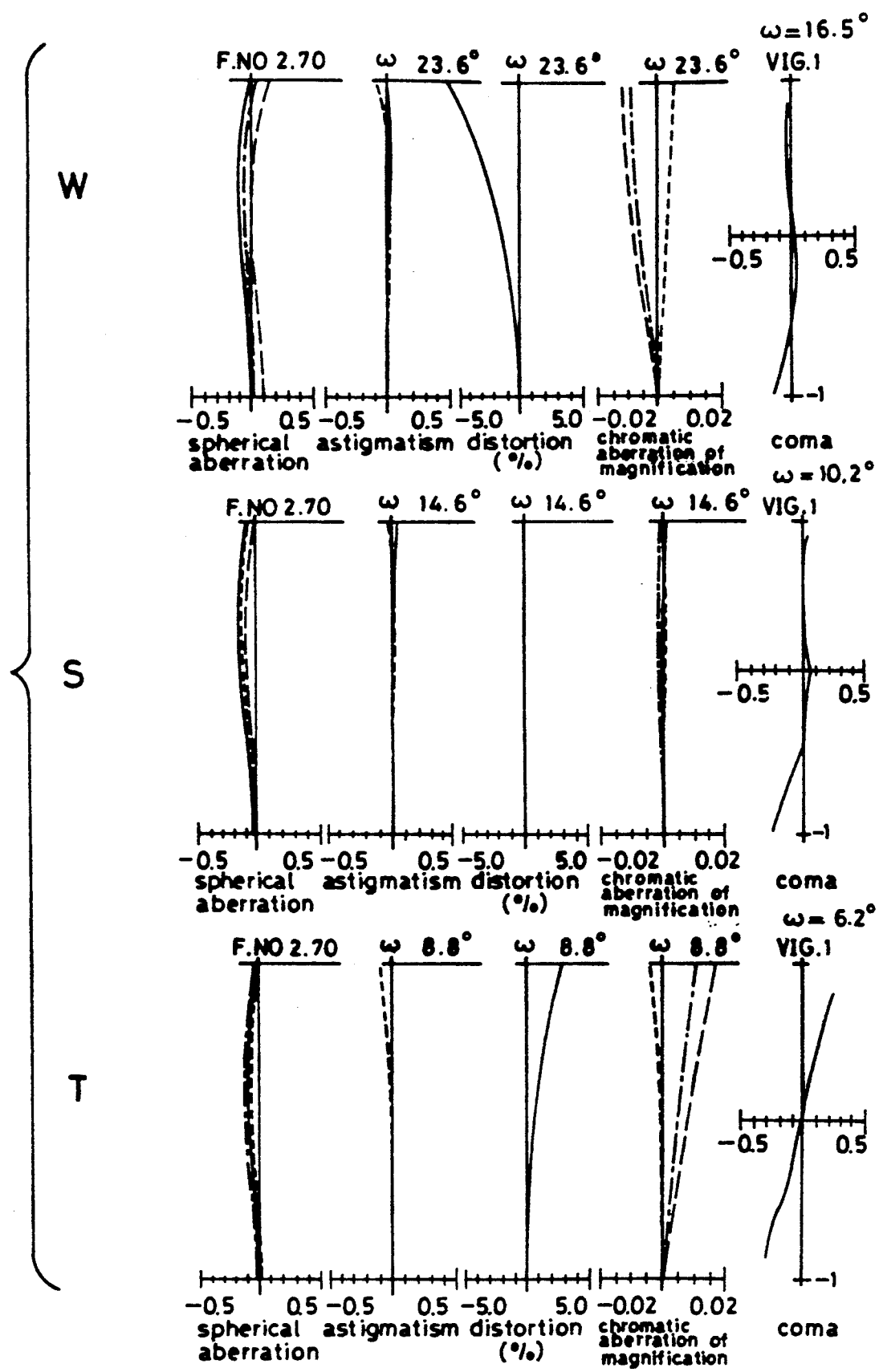
Figure 15:
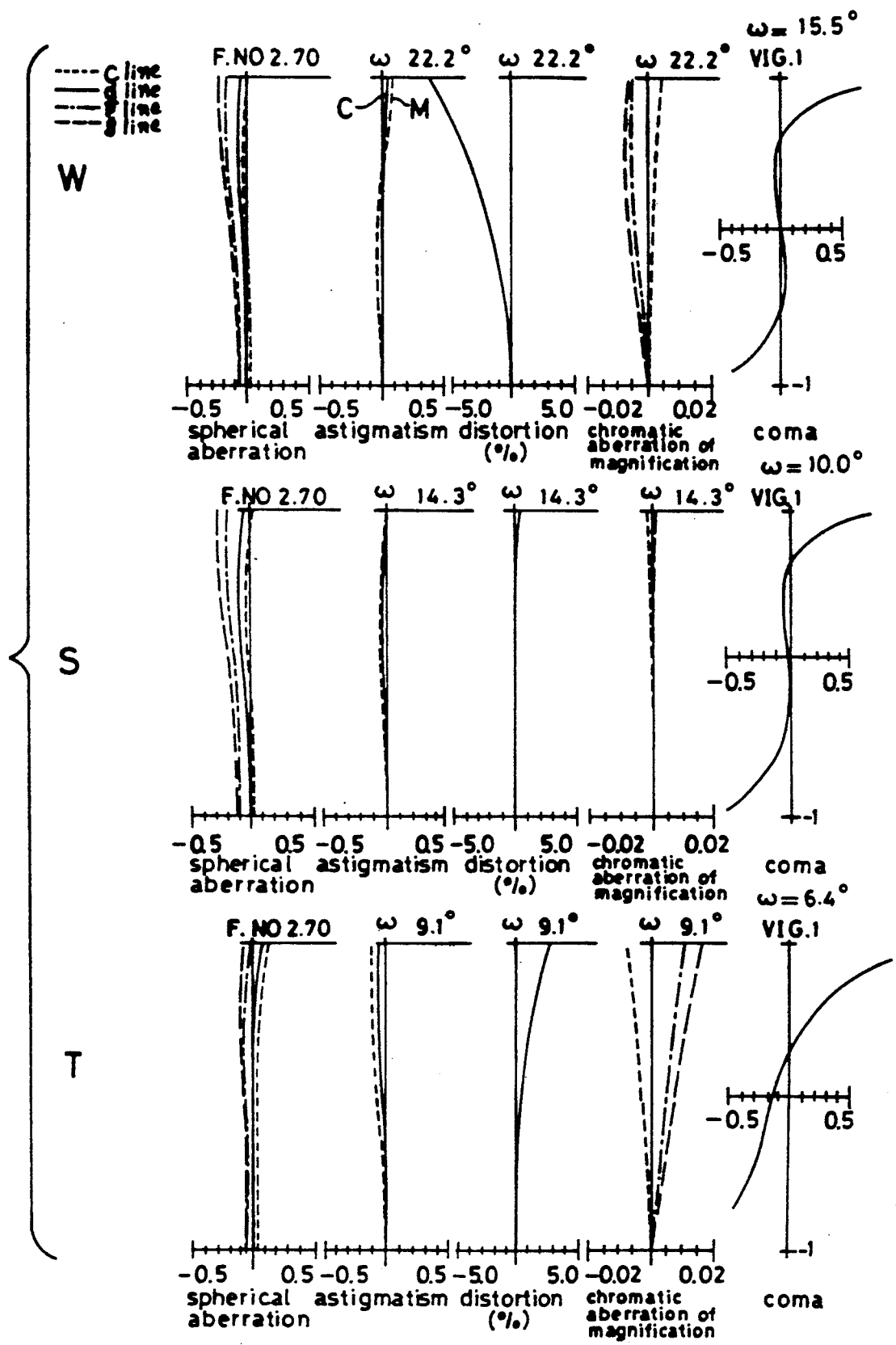
Figure 16:
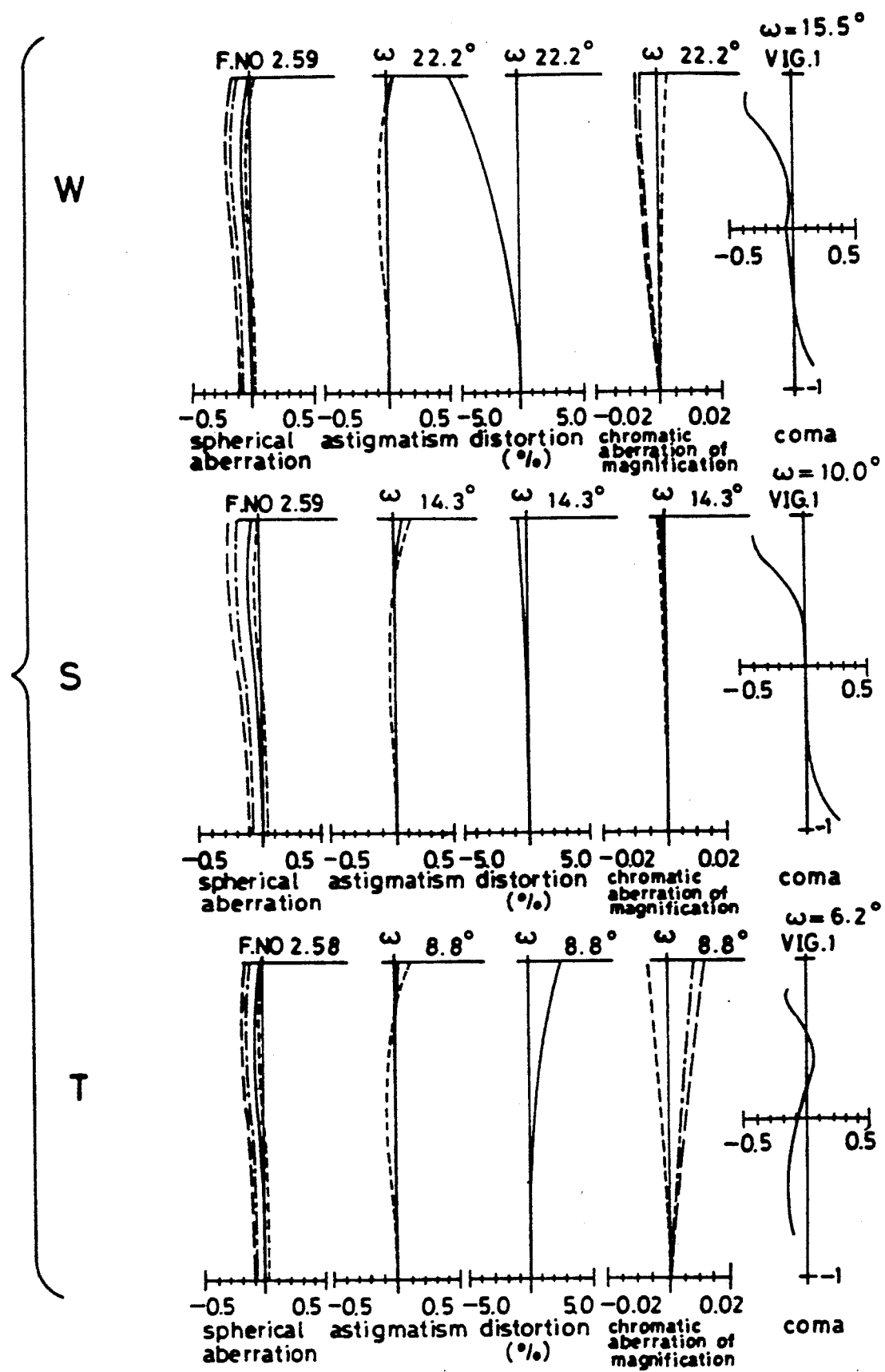
Figure 17:
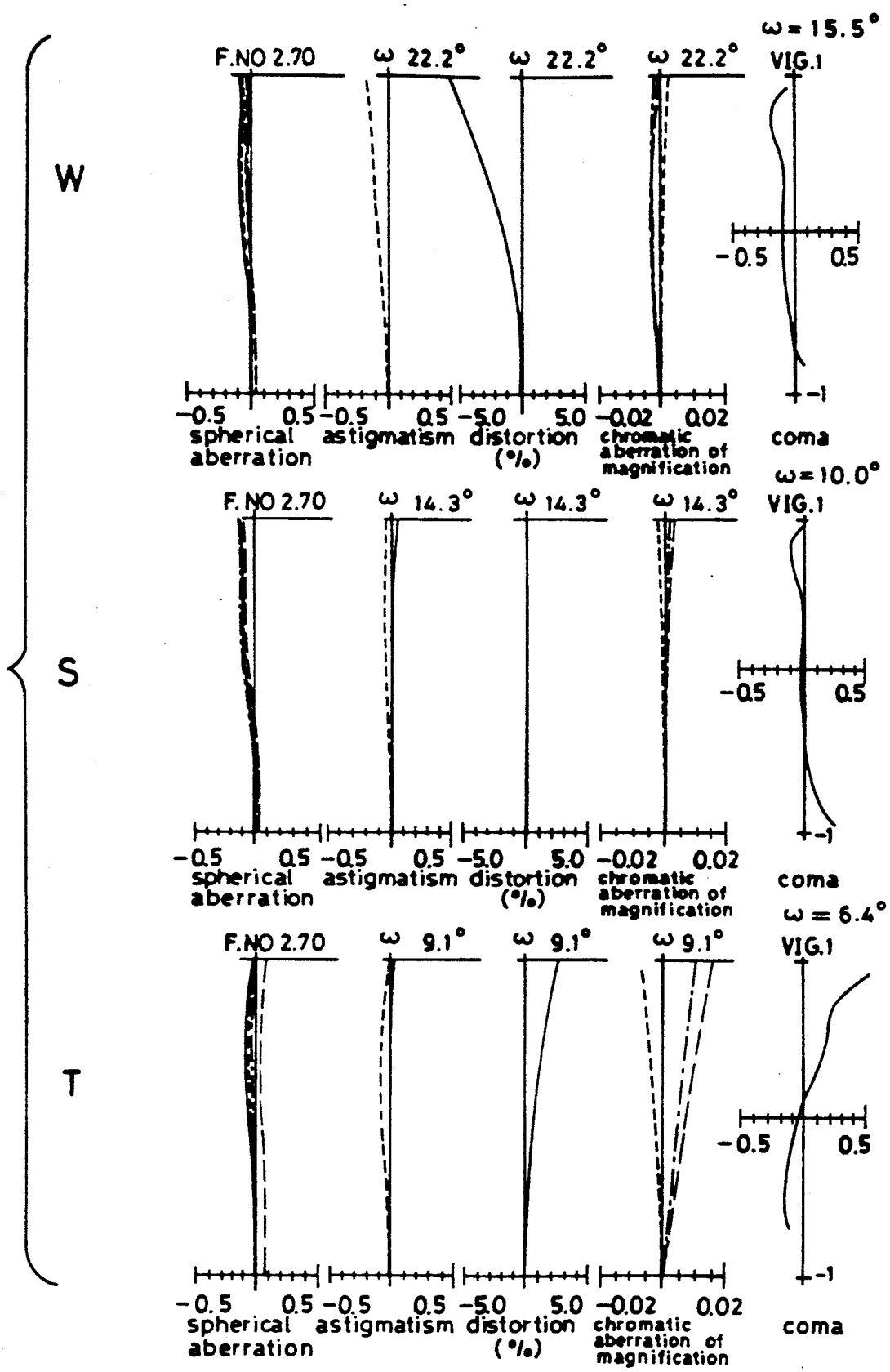
Figure 18:
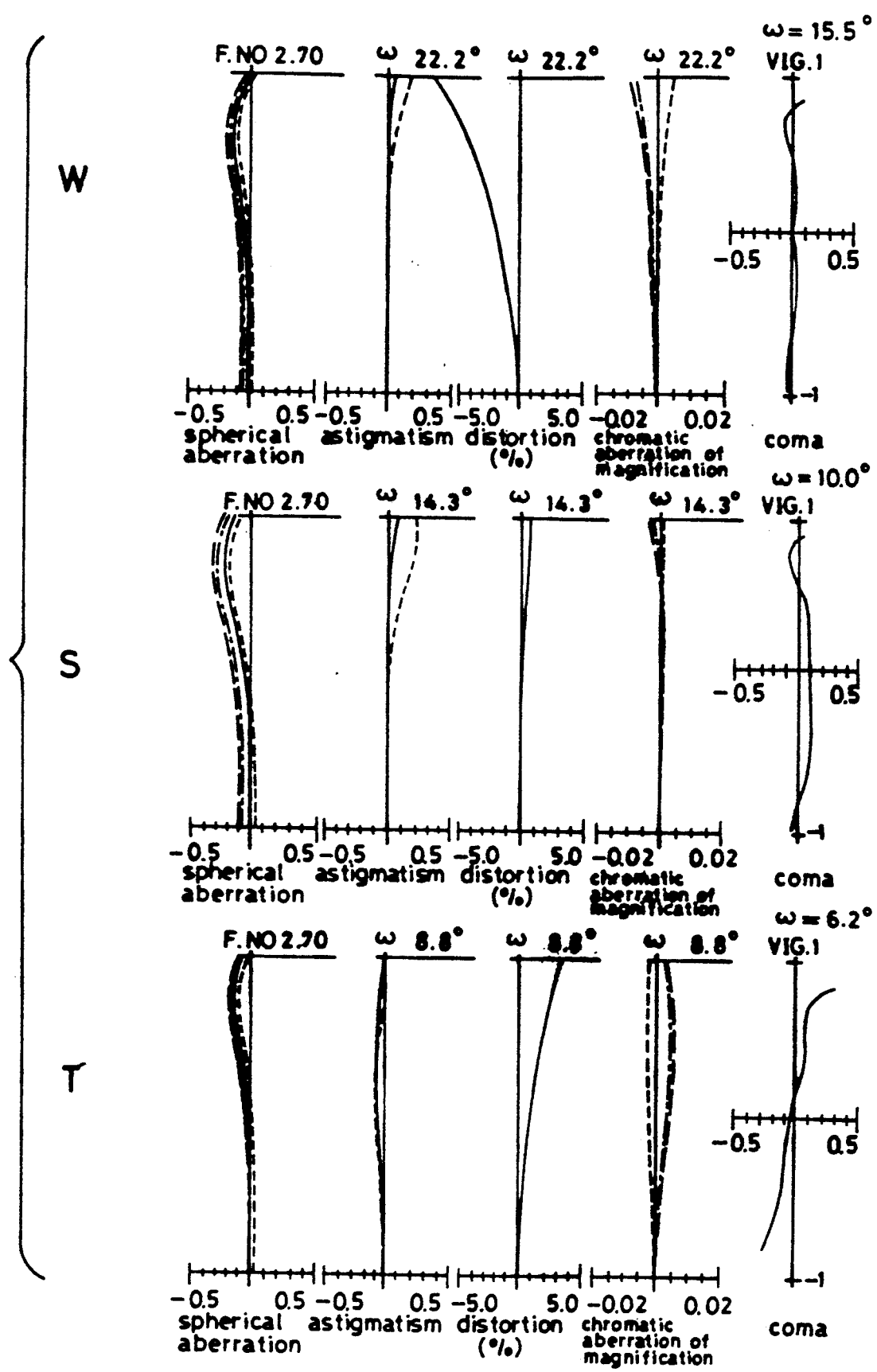
Figure 19:
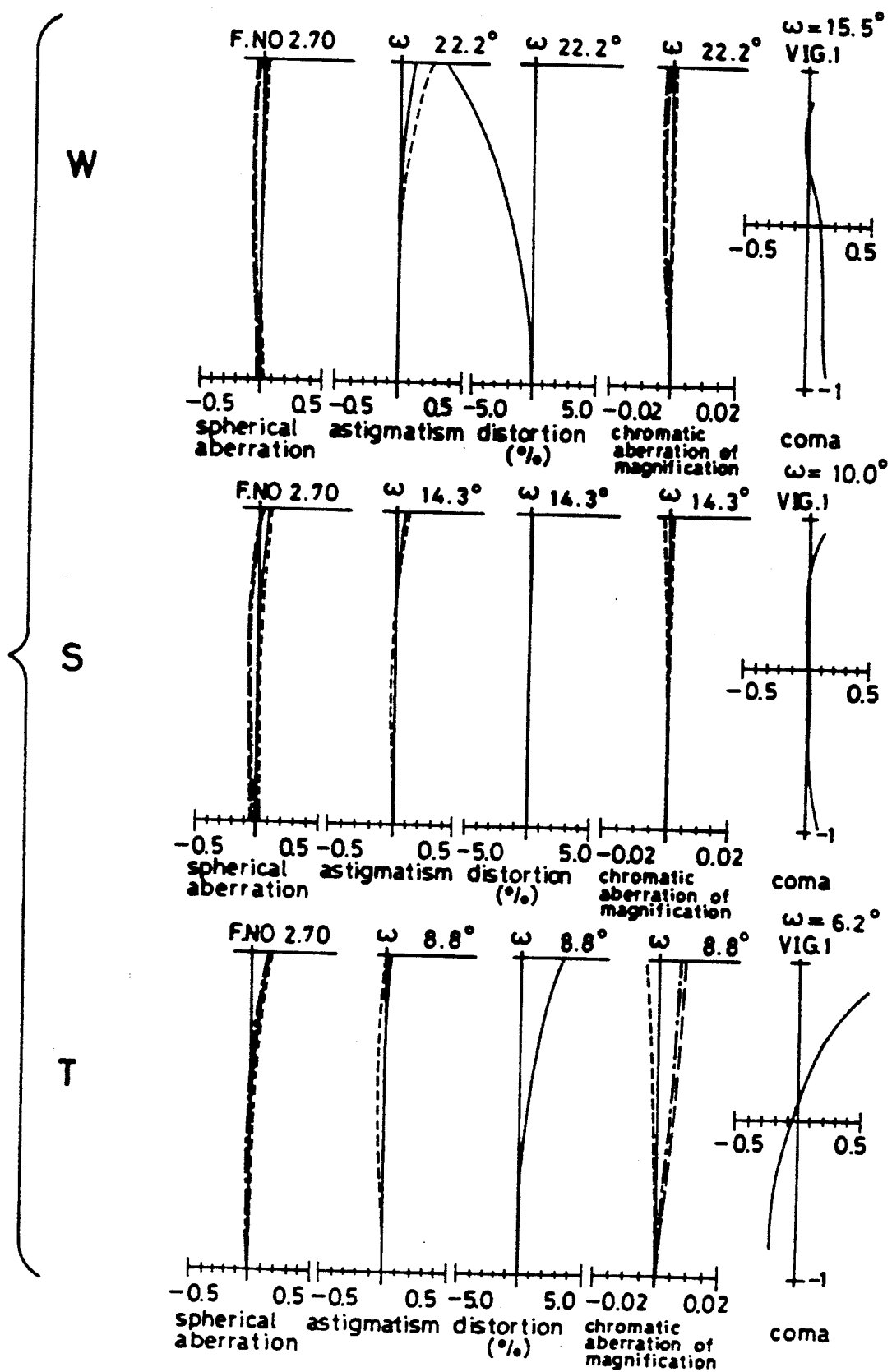
Figure 20:
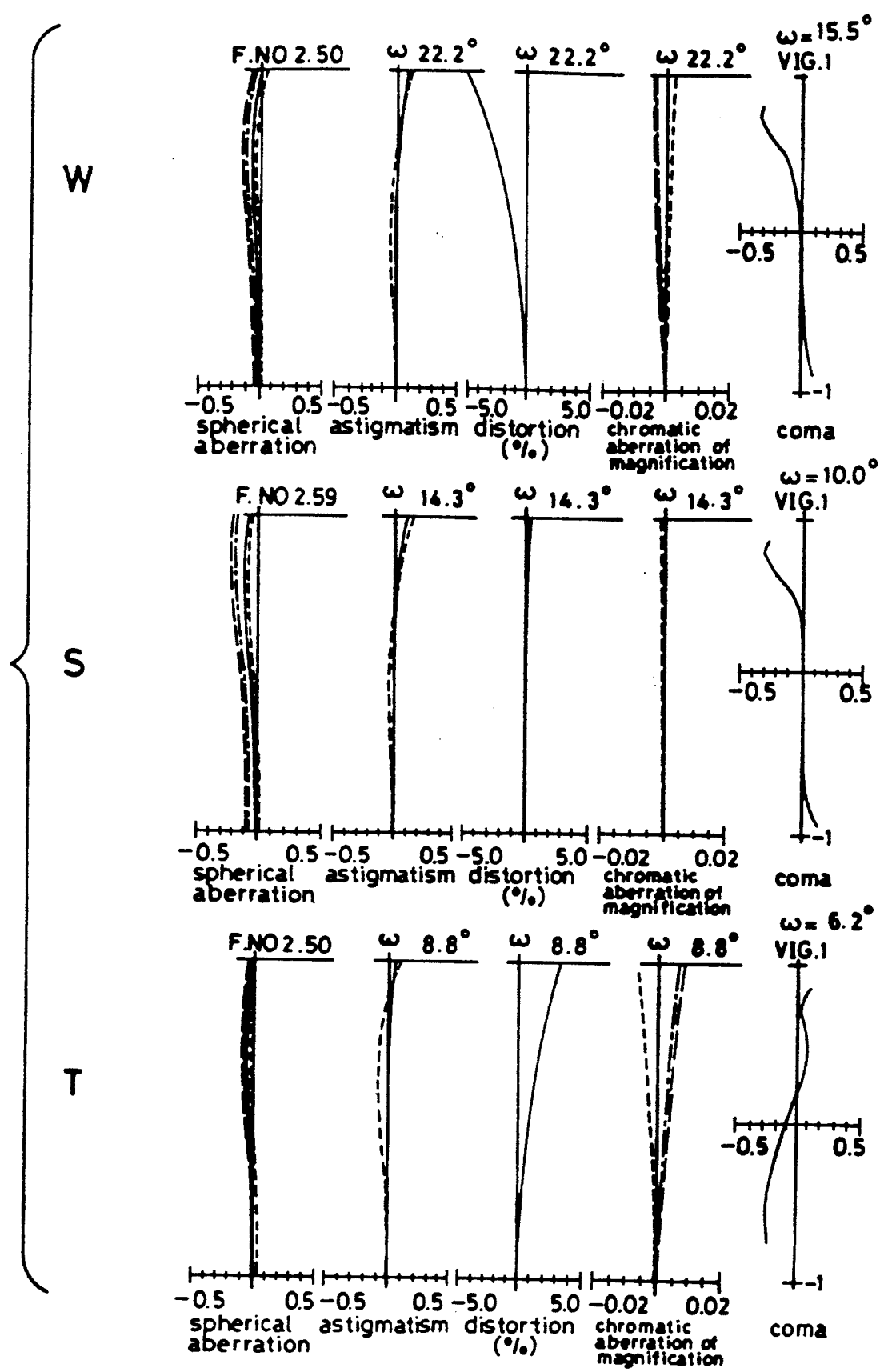

The zoom lens systems of this invention will now be explained specifically with reference to Examples I to 13, the numerical lens data of which will be described later. In FIG. 1, there is shown a sectional view of the lens system according to Example 1 at the wide angle end (W). The first lens group I consists of two lenses, i.e., a negative meniscus lens and a double-convex positive lens; the second lens group II designed to move during zooming consists of two lenses, i.e., a negative meniscus lens and a double-concave negative lens; the third lens groups III designed to move separately from the second lens group II during zooming consists of one positive meniscus lens; and the fourth lens group IV is made integral with a stop and consists of three lenses, i.e., a double-convex positive lens, a negative meniscus lens concave on the object side and a double-convex positive lens. Thus, the total number of lenses in the total system is eight (8). In addition, optical members such as filters are disposed on the 18th to 22nd surfaces.

Although not illustrated, the differences between Example 1 and Examples 2-7 are that in Example 2 a positive meniscus lens is used as the second lens of the first lens group I in place of the double-convex positive lens and a double-concave negative lens is provided in place of the negative meniscus lens of the second lens group II; in Example 3 a positive meniscus lens is u5ed as the second lens of the first lens group I in place of the double-convex positive lens; in Examples 4 and 6 a positive meniscus lens is used a5 the second lens of the first lens group I in place of the double-convex positive lens, a double-concave negative lens is provided in place of the negative meniscus lens of the second lens group II and a positive meniscus lens is used in place of the third double-convex positive lens of the fourth lens group IV; in Example 5 a positive meniscus lens is used as the second lens of the first lens group I in place of the double-convex positive lens and a planoconcave negative lens concave on the object side is used in place of the second negative meniscus lens of the fourth lens group IV; and in Example 7 a positive meniscus lens is used as the second lens of the first lens group I in place of the double-concave positive lens and a positive meniscus lens is used in place of the first double-convex positive lens of the fourth lens group IV.

The sections of the lens systems according to Examples 8 to 13 at the wide angle end (W) are shown in FIGS. 2 to 7. In each of Examples 8-10, 12 and 13, the first lens group I consists of two lenses, i.e., a negative meniscus lens having a strong curvature on the image side and a positive meniscus lens having a strong curvature on the object side; and in Example 11 it consists of two lenses each having a strong curvature on the image side, i.e., a negative meniscus lens and a double-concave lens.

Referring to the second lens group II, in Example 8 or 12 it consists of two lenses, i.e., a negative meniscus lens having a strong curvature on the image side and a double-concave lens; in Example 9 it consists of a concave lens having a strong curvature on the image side and a negative meniscus lens having a strong curvature on the image side; in Example 10 it consists of two lenses each having a strong curvature on the image side, i.e., a concave lens and a double-concave lens; in Example 13 it consists of two negative meniscus lenses each having a strong curvature on the image side; and in Example 11 it consists of one double-concave lens having a strong curvature on the image side.

In each of Examples 8-13, the third lens group III is made up of one lens. For instance, in each of Examples 8-11 and 13 it consists of a positive meniscus lens convex on the object side and in Example 12 it consists of a double-convex lens.

In each of Examples 8-13, the fourth lens group IV consists of three lenses having positive, negative and positive refractive powers in order from the object side. In Example 8, 12 or 13 the first positive lens is made up of a double-convex lens; and in Example 9, 10 or 11 it consists of a meniscus lens. Referring to the second lens, it consists of a negative meniscus lens having a strong curvature on the image side in each of Examples 8-13, and referring to the third lens, it consists of a double-convex lens in Example 8 and a positive meniscus lens having a strong curvature on the object side in each of Example 9-13.

The aspherical surfaces are applied to:

two surfaces in Example 1, 3, 6 or 7, i.e., the image-side surface of the first lens and the image-side surface of the third lens of the fourth lens group IV;

two surface in Example 2 or 5, i.e., the object-side surface of the second lens and the image-side surface of the third lens of the fourth lens group IV;

only a single surface in Example 4, i.e., the image-side surface of the third lens of the fourth lens group IV;

two surfaces in Example 8, i.e., the object-side surface of the first lens of the fourth lens group IV and the final surface of the fourth lens group IV;

two surfaces in Examples 9, 10 or 13, i.e., the object-side surface of the first lens and image-side surface of the second lens of the fourth lens group IV;

two surfaces in Example 12, i.e., the object-side surface of the first lens and the object-side surface of the final lens of the fourth lens group IV; and three surfaces in Example 11, i.e., the image-side surface of the second lens group II and the object-side surface of the first lens and the final surface of the fourth lens group IV.

It is noted that the 18th to 22nd surfaces in each of Examples 7-10 and 12-13 and the 16th to 20th in Example 11 stands for optical members such as filters.

Set out below are the numerical lens data according to the examples of this invention, wherein the symbols have the following meanings:

f. . . the focal length of the total system
$F_{NO}$ . . . the F-number  $\omega$ . . . the half field angle
$\Sigma d$ . . . the total thickness from the 1st to 17th surfaces
$f_W$ . . . the focal length of the total system at the wide angle end
$r_1, r_2, \ldots$ the radii of curvature of the respective lens surfaces
$d_1, d_2, \ldots$ the space between the adjacent lens surfaces
$n_{d1}, n_{d2}, \ldots$ the refractive indices of the respective lenses with respect to d-lines
$\nu_{d1}, \nu_{d2}, \ldots$ the Abbe's number of the respective lenses
Assuming that x is the optical axis direction and y is the direction normal thereto, the aspherical shape is expressed by the following equation:

$$x=(y^2/r)/[1+\{1-P(y^2/r^2)\}^{\frac{1}{2}}]+A_4Y^4+A_6Y^6+A_8y^8$$

wherein r is the paraxial radius of curvature, P is the conical coefficient, and $A_4$, $A_6$ and $A_8$ are the aspherical coefficients.

Example 1 f = 7~12.1~21
$F_{NO}$ = 2.7~2.7~2.7
$\omega$ = 23.6~14.6~8.8°

| | | |
|---|---|---|
| $r_1$ = 17.0244 | $d_1$ = 0.9000 | $n_{d1}$ = 1.84666  $\nu_{d1}$ = 23.78 |
| $r_2$ = 12.5418 | $d_2$ = 0.4399 | |
| $r_3$ = 13.7789 | $d_3$ = 4.0717 | $n_{d2}$ = 1.69680  $\nu_{d2}$ = 56.49 |

-continued

| | | | |
|---|---|---|---|
| $r_4 = -248.8670$ | $d_4 =$ (Variable) | | |
| $r_5 = 225.3421$ | $d_5 = 0.7000$ | $n_{d3} = 1.69680$ | $\nu_{d3} = 56.49$ |
| $r_6 = 8.9043$ | $d_6 = 1.4300$ | | |
| $r_7 = -23.7791$ | $d_7 = 0.7000$ | $n_{d4} = 1.61700$ | $\nu_{d4} = 62.79$ |
| $r_8 = 9.0221$ | $d_8 =$ (Variable) | | |
| $r_9 = 10.5428$ | $d_9 = 1.6000$ | $n_{d5} = 1.84666$ | $\nu_{d5} = 23.78$ |
| $r_{10} = 32.3563$ | $d_{10} =$ (Variable) | | |
| $r_{11} = \infty$ (Stop) | $d_{11} = 0.8000$ | | |
| $r_{12} = 43.3402$ | $d_{12} = 2.3000$ | $n_{d6} = 1.72000$ | $\nu_{d6} = 50.25$ |
| $r_{13} = -14.7945$ (Aspheric) | $d_{13} = 0.7000$ | | |
| $r_{14} = -4.5008$ | $d_{14} = 0.8000$ | $n_{d7} = 1.80518$ | $\nu_{d7} = 25.43$ |
| $r_{15} = -21.7743$ | $d_{15} = 0.0300$ | | |
| $r_{16} = 19.2085$ | $d_{16} = 3.1373$ | $n_{d8} = 1.69350$ | $\nu_{d8} = 53.23$ |
| $r_{17} = -5.5614$ (Aspheric) | $d_{17} = 10.4100$ | | |
| $r_{18} = \infty$ | $d_{18} = 1.2000$ | $n_{d9} = 1.51633$ | $\nu_{d9} = 64.15$ |
| $r_{19} = \infty$ | $d_{19} = 3.3000$ | $n_{d10} = 1.54771$ | $\nu_{d10} = 62.83$ |
| $r_{20} = \infty$ | $d_{20} = 0.3750$ | | |
| $r_{21} = \infty$ | $d_{21} = 0.4500$ | $n_{d11} = 1.51633$ | $\nu_{d11} = 64.15$ |
| $r_{22} = \infty$ | | | |

Zooming Specs
| f | 7 | 12.1 | 21 |
|---|---|---|---|
| $d_4$ | 0.763 | 6.015 | 10.286 |
| $d_8$ | 0.800 | 1.463 | 0.800 |
| $d_{10}$ | 10.593 | 4.679 | 1.071 |

Aspherical Coefficients
13th surface
$P = 1$
$A_4 = -0.41497 \times 10^{-3}$
$A_6 = 0.12121 \times 10^{-4}$
$A_8 = -0.61756 \times 10^{-5}$
17th surface
$P = 1$
$A_4 = 0.87352 \times 10^{-3}$
$A_6 = 0.17235 \times 10^{-4}$
$A_8 = 0.69742 \times 10^{-6}$
$\Sigma d/f_w = 4.14$ Example 2
$f = 7 \sim 12.1 \sim 21$
$F_{NO} = 2.7 \sim 2.7 \sim 2.7$
$\omega = 23.6 \sim 14.6 \sim 8.8°$

| | | | |
|---|---|---|---|
| $r_1 = 17.0165$ | $d_1 = 0.9000$ | $n_{d1} = 1.84666$ | $\nu_{d1} = 23.78$ |
| $r_2 = 12.7572$ | $d_2 = 0.3767$ | | |
| $r_3 = 13.8099$ | $d_3 = 3.8143$ | $n_{d2} = 1.69680$ | $\nu_{d2} = 56.49$ |
| $r_4 = 1844.0078$ | $d_4 =$ (Variable) | | |
| $r_5 = -366.6231$ | $d_5 = 0.7000$ | $n_{d3} = 1.69680$ | $\nu_{d3} = 56.49$ |
| $r_6 = 7.4382$ | $d_6 = 1.4413$ | | |
| $r_7 = -35.1868$ | $d_7 = 0.7000$ | $n_{d4} = 1.61700$ | $\nu_{d4} = 62.79$ |
| $r_8 = 13.5189$ | $d_8 =$ (Variable) | | |
| $r_9 = 12.0015$ | $d_9 = 1.6000$ | $n_{d5} = 1.84666$ | $\nu_{d5} = 23.78$ |
| $r_{10} = 40.2557$ | $d_{10} =$ (Variable) | | |
| $r_{11} = \infty$ (Stop) | $d_{11} = 0.8000$ | | |
| $r_{12} = 35.9168$ | $d_{12} = 2.3000$ | $n_{d6} = 1.72000$ | $\nu_{d6} = 50.25$ |
| $r_{13} = -14.3651$ | $d_{13} = 0.7000$ | | |
| $r_{14} = -4.5184$ (Aspheric) | $d_{14} = 0.8000$ | $n_{d7} = 1.80518$ | $\nu_{d7} = 25.43$ |
| $r_{15} = -19.8891$ | $d_{15} = 0.0300$ | | |
| $r_{16} = 34.4258$ | $d_{16} = 2.7326$ | $n_{d8} = 1.69350$ | $\nu_{d8} = 53.23$ |
| $r_{17} = -5.3468$ (Aspheric) | $d_{17} = 10.4100$ | | |
| $r_{18} = \infty$ | $d_{18} = 1.2000$ | $n_{d9} = 1.51633$ | $\nu_{d9} = 64.15$ |
| $r_{19} = \infty$ | $d_{19} = 3.3000$ | $n_{d10} = 1.54771$ | $\nu_{d10} = 62.83$ |
| $r_{20} = \infty$ | $d_{20} = 0.3750$ | | |
| $r_{21} = \infty$ | $d_{21} = 0.4500$ | $n_{d11} = 1.51633$ | $\nu_{d11} = 64.15$ |
| $r_{22} = \infty$ | | | |

Zooming Specs
| f | 7 | 12.1 | 21 |
|---|---|---|---|
| $d_4$ | 0.763 | 6.444 | 11.039 |
| $d_8$ | 0.800 | 1.518 | 0.800 |
| $d_{10}$ | 11.307 | 4.908 | 1.032 |

Aspherical Coefficients
14th surface
$P = 1$
$A_4 = 0.28577 \times 10^{-3}$
$A_6 = -0.15386 \times 10^{-6}$
$A_8 = 0.27645 \times 10^{-5}$
17th surface
$P = 1$
$A_4 = 0.80707 \times 10^{-3}$
$A_6 = 0.92142 \times 10^{-5}$
$A_8 = 0.10054 \times 10^{-5}$
$\Sigma d/f_w = 4.14$ Example 3
$f = 7.5 \sim 12.3 \sim 20.25$
$F_{NO} = 2.7 \sim 2.7 \sim 2.7$ -continued $\omega = 22.2 \sim 14.3 \sim 9.2°$
| | | | |
|---|---|---|---|
| $r_1 = 16.1628$ | $d_1 = 0.8746$ | $n_{d1} = 1.84666$ | $\nu_{d1} = 23.78$ |
| $r_2 = 11.7181$ | $d_2 = 0.2000$ | | |
| $r_3 = 12.1744$ | $d_3 = 3.7183$ | $n_{d2} = 1.69680$ | $\nu_{d2} = 56.49$ |
| $r_4 = 312.3193$ | $d_4 = $ (Variable) | | |
| $r_5 = 217.2879$ | $d_5 = 0.7000$ | $n_{d3} = 1.69680$ | $\nu_{d3} = 56.49$ |
| $r_6 = 7.8358$ | $d_6 = 1.2561$ | | |
| $r_7 = -28.9059$ | $d_7 = 0.9997$ | $n_{d4} = 1.61700$ | $\nu_{d4} = 62.79$ |
| $r_8 = 10.2060$ | $d_8 = $ (Variable) | | |
| $r_9 = 11.2461$ | $d_9 = 1.9897$ | $n_{d5} = 1.84666$ | $\nu_{d5} = 23.78$ |
| $r_{10} = 43.9245$ | $d_{10} = $ (Variable) | | |
| $r_{11} = \infty$ (Stop) | $d_{11} = 0.8003$ | | |
| $r_{12} = 36.2985$ | $d_{12} = 2.4990$ | $n_{d6} = 1.72000$ | $\nu_{d6} = 50.25$ |
| $r_{13} = -10.5487$ (Aspheric) | $d_{13} = 0.8211$ | | |
| $r_{14} = -4.2523$ | $d_{14} = 0.8653$ | $n_{d7} = 1.80518$ | $\nu_{d7} = 25.43$ |
| $r_{15} = -19.4341$ | $d_{15} = 0.0500$ | | |
| $r_{16} = 43.8965$ | $d_{16} = 3.2996$ | $n_{d8} = 1.69350$ | $\nu_{d8} = 53.23$ |
| $r_{17} = -5.5041$ (Aspheric) | $d_{17} = 10.4100$ | | |
| $r_{18} = \infty$ | $d_{18} = 1.2000$ | $n_{d9} = 1.51633$ | $\nu_{d9} = 64.15$ |
| $r_{19} = \infty$ | $d_{19} = 3.3000$ | $n_{d10} = 1.54771$ | $\nu_{d10} = 62.83$ |
| $r_{20} = \infty$ | $d_{20} = 0.3750$ | | |
| $r_{21} = \infty$ | $d_{21} = 0.4500$ | $n_{d11} = 1.51633$ | $\nu_{d11} = 64.15$ |
| $r_{22} = \infty$ | | | |

Zooming Speces

| f | 7.5 | 12.3 | 20.25 |
|---|---|---|---|
| $d_4$ | 0.763 | 5.685 | 9.592 |
| $d_8$ | 0.765 | 1.231 | 0.686 |
| $d_{10}$ | 9.663 | 4.275 | 0.913 |

Aspherical Coefficients
13th surface
$P = 1$
$A_4 = -0.54755 \times 10^{-3}$
$A_6 = 0.35175 \times 10^{-4}$
$A_8 = -0.75120 \times 10^{-5}$
17th surface
$P = 1$
$A_4 = 0.71510 \times 10^{-3}$
$A_6 = 0.27054 \times 10^{-5}$
$A_8 = 0.10865 \times 10^{-5}$
$\Sigma d/f_w = 3.79$ Example 4

$f = 10 \sim 16.4 \sim 27$
$F_{NO} = 2.7 \sim 2.7 \sim 2.7$
$\omega = 22.2 \sim 14.3 \sim 9.1°$

| | | | |
|---|---|---|---|
| $r_1 = 20.0477$ | $d_1 = 0.9000$ | $n_{d1} = 1.84666$ | $\nu_{d1} = 23.78$ |
| $r_2 = 15.2475$ | $d_2 = 0.2723$ | | |
| $r_3 = 16.0036$ | $d_3 = 3.8000$ | $n_{d2} = 1.69680$ | $\nu_{d2} = 56.49$ |
| $r_4 = 251.1725$ | $d_4 = $ (Variable) | | |
| $r_5 = -252.1226$ | $d_5 = 0.7000$ | $n_{d3} = 1.69680$ | $\nu_{d3} = 56.49$ |
| $r_6 = 8.7139$ | $d_6 = 1.6279$ | | |
| $r_7 = -26.4005$ | $d_7 = 0.7000$ | $n_{d4} = 1.61700$ | $\nu_{d4} = 62.79$ |
| $r_8 = 27.9728$ | $d_8 = $ (Variable) | | |
| $r_9 = 17.0417$ | $d_9 = 1.8500$ | $n_{d5} = 1.84666$ | $\nu_{d5} = 23.78$ |
| $r_{10} = 104.0642$ | $d_{10} = $ (Variable) | | |
| $r_{11} = \infty$ (Stop) | $d_{11} = 0.8000$ | | |
| $r_{12} = 35.4180$ | $d_{12} = 2.0146$ | $n_{d6} = 1.75500$ | $\nu_{d6} = 52.33$ |
| $r_{13} = -16.7116$ | $d_{13} = 0.7313$ | | |
| $r_{14} = -6.3940$ | $d_{14} = 0.8000$ | $n_{d7} = 1.80518$ | $\nu_{d7} = 25.43$ |
| $r_{15} = -25.9308$ | $d_{15} = 0.5085$ | | |
| $r_{16} = -214.8578$ | $d_{16} = 3.1005$ | $n_{d8} = 1.69350$ | $\nu_{d8} = 53.23$ |
| $r_{17} = -7.0500$ (Aspheric) | $d_{17} = 13.8800$ | | |
| $r_{18} = \infty$ | $d_{18} = 1.6000$ | $n_{d9} = 1.51633$ | $\nu_{d9} = 64.15$ |
| $r_{19} = \infty$ | $d_{19} = 4.4000$ | $n_{d10} = 1.54771$ | $\nu_{d10} = 62.83$ |
| $r_{20} = \infty$ | $d_{20} = 0.5000$ | | |
| $r_{21} = \infty$ | $d_{21} = 0.6000$ | $n_{d11} = 1.51633$ | $\nu_{d11} = 64.15$ |
| $r_{22} = \infty$ | | | |

Zooming Speces

| f | 10 | 16.4 | 27 |
|---|---|---|---|
| $d_4$ | 1.017 | 7.564 | 12.755 |
| $d_8$ | 0.800 | 1.494 | 0.800 |
| $d_{10}$ | 12.738 | 5.497 | 1.000 |

Aspherical Coefficients
17th surface
$P = 1$
$A_4 = 0.21830 \times 10^{-3}$
$A_6 = 0.40307 \times 10^{-5}$
$A_8 = 0.22491 \times 10^{-7}$
$\Sigma d/f_w = 3.14$ Example 5

$f = 7 \sim 12.1 \sim 21$
$F_{NO} = 2.59 \sim 2.59 \sim 2.59$
$\omega = 23.6 \sim 14.6 \sim 8.8°$ -continued

| | | | |
|---|---|---|---|
| $r_1 = 18.4390$ | $d_1 = 0.8998$ | $n_{d1} = 1.84666$ | $\nu_{d1} = 23.78$ |
| $r_2 = 14.3787$ | $d_2 = 0.3118$ | | |
| $r_3 = 15.3025$ | $d_3 = 3.6506$ | $n_{d2} = 1.69680$ | $\nu_{d2} = 56.49$ |
| $r_4 = 392.2400$ | $d_4 =$ (Variable) | | |
| $r_5 = 64.2719$ | $d_5 = 0.7000$ | $n_{d3} = 1.69680$ | $\nu_{d3} = 56.49$ |
| $r_6 = 9.0376$ | $d_6 = 1.2095$ | | |
| $r_7 = -25.8962$ | $d_7 = 0.6998$ | $n_{d4} = 1.61700$ | $\nu_{d4} = 62.79$ |
| $r_8 = 10.5476$ | $d_8 =$ (Variable) | | |
| $r_9 = 12.5906$ | $d_9 = 1.5998$ | $n_{d5} = 1.84666$ | $\nu_{d5} = 23.78$ |
| $r_{10} = 46.3284$ | $d_{10} =$ (Variable) | | |
| $r_{11} = \infty$ (Stop) | $d_{11} = 0.7998$ | | |
| $r_{12} = 47.1370$ | $d_{12} = 1.3673$ | $n_{d6} = 1.72000$ | $\nu_{d6} = 50.25$ |
| $r_{13} = -34.7454$ | $d_{13} = 0.6998$ | | |
| $r_{14} = -7.3337$ (Aspheric) | $d_{14} = 0.7999$ | $n_{d7} = 1.80518$ | $\nu_{d7} = 25.43$ |
| $r_{15} = \infty$ | $d_{15} = 0.0300$ | | |
| $r_{16} = 29.2316$ | $d_{16} = 3.2412$ | $n_{d8} = 1.69350$ | $\nu_{d8} = 53.23$ |
| $r_{17} = -5.2238$ (Aspheric) | $d_{17} = 10.4100$ | | |
| $r_{18} = \infty$ | $d_{18} = 1.2000$ | $n_{d9} = 1.51633$ | $\nu_{d9} = 64.15$ |
| $r_{19} = \infty$ | $d_{19} = 3.3000$ | $n_{d10} = 1.54771$ | $\nu_{d10} = 62.83$ |
| $r_{20} = \infty$ | $d_{20} = 0.3750$ | | |
| $r_{21} = \infty$ | $d_{21} = 0.4500$ | $n_{d11} = 1.51633$ | $\nu_{d11} = 64.15$ |
| $r_{22} = \infty$ | | | |

Zooming Specs

| f | 7 | 12.1 | 21 |
|---|---|---|---|
| $d_4$ | 0.763 | 6.908 | 11.938 |
| $d_8$ | 0.800 | 1.543 | 0.800 |
| $d_{10}$ | 12.193 | 5.305 | 1.018 |

Aspherical Coefficients
14th surface
$P = 1$
$A_4 = -0.16764 \times 10^{-2}$
$A_6 = -0.38003 \times 10^{-4}$
$A_8 = -0.93538 \times 10^{-5}$
17th surface
$P = 1$
$A_4 = 0.13601 \times 10^{-3}$
$A_6 = 0.70434 \times 10^{-6}$
$A_8 = 0.50752 \times 10^{-6}$
$\Sigma d/f_w = 4.14$ Example 6
$f = 7 \sim 12.1 \sim 21$
$F_{NO} = 2.7 \sim 2.7 \sim 2.7$
$\omega = 23.6 \sim 14.6 \sim 8.8°$

| | | | |
|---|---|---|---|
| $r_1 = 16.5980$ | $d_1 = 0.9000$ | $n_{d1} = 1.84666$ | $\nu_{d1} = 23.78$ |
| $r_2 = 12.7272$ | $d_2 = 0.4191$ | | |
| $r_3 = 13.9951$ | $d_3 = 3.7648$ | $n_{d2} = 1.69680$ | $\nu_{d2} = 56.49$ |
| $r_4 = 946.1306$ | $d_4 =$ (Variable) | | |
| $r_5 = -358.8426$ | $d_5 = 0.7000$ | $n_{d3} = 1.69680$ | $\nu_{d3} = 56.49$ |
| $r_6 = 7.0228$ | $d_6 = 1.4316$ | | |
| $r_7 = -62.6283$ | $d_7 = 0.7000$ | $n_{d4} = 1.61700$ | $\nu_{d4} = 62.79$ |
| $r_8 = 12.1491$ | $d_8 =$ (Variable) | | |
| $r_9 = 10.5796$ | $d_9 = 1.6000$ | $n_{d5} = 1.84666$ | $\nu_{d5} = 23.78$ |
| $r_{10} = 29.7319$ | $d_{10} =$ (Variable) | | |
| $r_{11} = \infty$ (Stop) | $d_{11} = 0.8000$ | | |
| $r_{12} = 36.1951$ (Aspheric) | $d_{12} = 2.3000$ | $n_{d6} = 1.72000$ | $\nu_{d6} = 50.25$ |
| $r_{13} = -9.1639$ | $d_{13} = 0.7000$ | | |
| $r_{14} = -4.0000$ | $d_{14} = 0.8000$ | $n_{d7} = 1.80518$ | $\nu_{d7} = 25.43$ |
| $r_{15} = -11.5000$ | $d_{15} = 0.0300$ | | |
| $r_{16} = -22.2545$ | $d_{16} = 2.7456$ | $n_{d8} = 1.69350$ | $\nu_{d8} = 53.23$ |
| $r_{17} = -4.8895$ (Aspheric) | $d_{17} = 10.4100$ | | |
| $r_{18} = \infty$ | $d_{18} = 1.2000$ | $n_{d9} = 1.51633$ | $\nu_{d9} = 64.15$ |
| $r_{19} = \infty$ | $d_{19} = 3.3000$ | $n_{d10} = 1.54771$ | $\nu_{d10} = 62.83$ |
| $r_{20} = \infty$ | $d_{20} = 0.3750$ | | |
| $r_{21} = \infty$ | $d_{21} = 0.4500$ | $n_{d11} = 1.51633$ | $\nu_{d11} = 64.15$ |
| $r_{22} = \infty$ | | | |

Zooming Specs

| f | 7 | 12.1 | 21 |
|---|---|---|---|
| $d_4$ | 0.763 | 6.410 | 10.996 |
| $d_8$ | 0.800 | 1.474 | 0.800 |
| $d_{10}$ | 11.311 | 4.989 | 1.078 |

Aspherical Coefficients
12th surface
$P = 1$
$A_4 = 0.15310 \times 10^{-3}$
$A_6 = -0.87951 \times 10^{-5}$
$A_8 = 0.41752 \times 10^{-5}$
17th surface
$P = 1$
$A_4 = 0.55985 \times 10^{-3}$
$A_6 = 0.43635 \times 10^{-5}$
$A_8 = 0.15596 \times 10^{-5}$
$\Sigma d/f_w = 4.14$

Example 7

$f = 7 \sim 12.1 \sim 21$
$F_{NO} = 2.7 \sim 2.7 \sim 2.7$
$\omega = 23.6 \sim 14.6 \sim 8.8°$

| | | | |
|---|---|---|---|
| $r_1 = 15.0501$ | $d_1 = 0.8999$ | $n_{d1} = 1.84666$ | $\nu_{d1} = 23.78$ |
| $r_2 = 11.5746$ | $d_2 = 0.3934$ | | |
| $r_3 = 12.4246$ | $d_3 = 4.1501$ | $n_{d2} = 1.69680$ | $\nu_{d2} = 56.49$ |
| $r_4 = 316.9659$ | $d_4 = $ (Variable) | | |
| $r_5 = 77.5243$ | $d_5 = 0.7000$ | $n_{d3} = 1.69680$ | $\nu_{d3} = 56.49$ |
| $r_6 = 8.2943$ | $d_6 = 1.2264$ | | |
| $r_7 = -37.8002$ | $d_7 = 0.7000$ | $n_{d4} = 1.61700$ | $\nu_{d4} = 62.79$ |
| $r_8 = 7.7514$ | $d_8 = $ (Variable) | | |
| $r_9 = 9.2530$ | $d_9 = 1.6000$ | $n_{d5} = 1.84666$ | $\nu_{d5} = 23.78$ |
| $r_{10} = 18.9073$ | $d_{10} = $ (Variable) | | |
| $r_{11} = \infty$ (Stop) | $d_{11} = 0.7999$ | | |
| $r_{12} = -75.6300$ | $d_{12} = 2.6000$ | $n_{d6} = 1.72000$ | $\nu_{d6} = 50.25$ |
| $r_{13} = -8.6215$ (Aspheric) | $d_{13} = 0.7000$ | | |
| $r_{14} = -3.9213$ | $d_{14} = 0.7999$ | $n_{d7} = 1.80518$ | $\nu_{d7} = 25.43$ |
| $r_{15} = -13.3028$ | $d_{15} = 0.0299$ | | |
| $r_{16} = 16.5212$ | $d_{16} = 3.8000$ | $n_{d8} = 1.69350$ | $\nu_{d8} = 53.23$ |
| $r_{17} = -6.1501$ (Aspheric) | $d_{17} = 10.4100$ | | |
| $r_{18} = \infty$ | $d_{18} = 1.2000$ | $n_{d9} = 1.51633$ | $\nu_{d9} = 64.15$ |
| $r_{19} = \infty$ | $d_{19} = 3.3000$ | $n_{d10} = 1.54771$ | $\nu_{d10} = 62.83$ |
| $r_{20} = \infty$ | $d_{20} = 0.3750$ | | |
| $r_{21} = \infty$ | $d_{21} = 0.4500$ | $n_{d11} = 1.51633$ | $\nu_{d11} = 64.15$ |
| $r_{22} = \infty$ | | | |

Zooming Speces

| f | 7 | 12.1 | 21 |
|---|---|---|---|
| $d_4$ | 0.763 | 5.547 | 9.430 |
| $d_8$ | 0.799 | 1.625 | 0.800 |
| $d_{10}$ | 9.803 | 4.194 | 1.135 |

Aspherical Coefficients
13th surface
$P = 1$
$A_4 = -0.10702 \times 10^{-2}$
$A_6 = -0.10090 \times 10^{-4}$
$A_8 = -0.99429 \times 10^{-5}$
17th surface
$P = 1$
$A_4 = 0.89388 \times 10^{-3}$
$A_6 = 0.17305 \times 10^{-4}$
$A_8 = 0.14902 \times 10^{-6}$
$\Sigma d/f_w = 4.14$

Example 8

$f = 10.3 \sim 16.5 \sim 26.2$
$F_{NO} = 2.70 \sim 2.70 \sim 2.70$
$\omega = 22.2 \sim 14.3 \sim 9.1°$

| | | | |
|---|---|---|---|
| $r_1 = 17.3276$ | $d_1 = 0.9000$ | $n_{d1} = 1.84666$ | $\nu_{d1} = 23.78$ |
| $r_2 = 12.5330$ | $d_2 = 0.2331$ | | |
| $r_3 = 13.0337$ | $d_3 = 4.3794$ | $n_{d2} = 1.69680$ | $\nu_{d2} = 56.49$ |
| $r_4 = 972.9636$ | $d_4 = $ (Variable) | | |
| $r_5 = 288.8612$ | $d_5 = 0.7000$ | $n_{d3} = 1.69680$ | $\nu_{d3} = 56.49$ |
| $r_6 = 10.9586$ | $d_6 = 1.4672$ | | |
| $r_7 = -19.1585$ | $d_7 = 0.7000$ | $n_{d4} = 1.61700$ | $\nu_{d4} = 62.79$ |
| $r_8 = 13.4611$ | $d_8 = $ (Variable) | | |
| $r_9 = 21.4719$ | $d_9 = 1.6000$ | $n_{d5} = 1.84666$ | $\nu_{d5} = 23.78$ |
| $r_{10} = 105.6096$ | $d_{10} = $ (Variable) | | |
| $r_{11} = \infty$ (Stop) | $d_{11} = 0.9000$ | | |
| $r_{12} = 6.4715$ (Aspheric) | $d_{12} = 3.5836$ | $n_{d6} = 1.72000$ | $\nu_{d6} = 50.25$ |
| $r_{13} = -14.2085$ | $d_{13} = 0.3286$ | | |
| $r_{14} = 11.5880$ | $d_{14} = 0.8000$ | $n_{d7} = 1.80518$ | $\nu_{d7} = 25.43$ |
| $r_{15} = 3.9376$ | $d_{15} = 1.2725$ | | |
| $r_{16} = 15.0000$ | $d_{16} = 2.0547$ | $n_{d8} = 1.69350$ | $\nu_{d8} = 53.23$ |
| $r_{17} = -157.4456$ (Aspheric) | $d_{17} = 4.1674$ | | |
| $r_{18} = \infty$ | $d_{18} = 1.6000$ | $n_{d9} = 1.51633$ | $\nu_{d9} = 64.15$ |
| $r_{19} = \infty$ | $d_{19} = 4.4000$ | $n_{d10} = 1.54771$ | $\nu_{d10} = 62.83$ |
| $r_{20} = \infty$ | $d_{20} = 0.5000$ | | |
| $r_{21} = \infty$ | $d_{21} = 0.6000$ | $n_{d11} = 1.51633$ | $\nu_{d11} = 64.15$ |
| $r_{22} = \infty$ | | | |

Zooming Speces

| f | 10.3 | 16.5 | 26.2 |
|---|---|---|---|
| $d_4$ | 1.017 | 5.988 | 9.853 |
| $d_8$ | 0.800 | 1.906 | 0.800 |
| $d_{10}$ | 9.836 | 3.759 | 1.000 |

Aspherical Coefficients
12th surface
$P = 1$
$A_4 = -0.77726 \times 10^{-3}$
$A_6 = -0.10124 \times 10^{-4}$
$A_8 = -0.26498 \times 10^{-6}$
17th surface
$P = 1$ -continued $A_4 = -0.72595 \times 10^{-3}$
$A_6 = 0.16787 \times 10^{-4}$
$A_8 = -0.62250 \times 10^{-5}$ Example 9
$f = 7.73 \sim 12.3 \sim 19.65$
$F_{NO} = 2.59 \sim 2.59 \sim 2.58$
$\omega = 22.2 \sim 14.3 \sim 8.8°$

| | | | |
|---|---|---|---|
| $r_1 = 12.9248$ | $d_1 = 0.8977$ | $n_{d1} = 1.84666$ | $\nu_{d1} = 23.78$ |
| $r_2 = 9.5685$ | $d_2 = 0.1700$ | | |
| $r_3 = 9.8366$ | $d_3 = 3.6000$ | $n_{d2} = 1.69680$ | $\nu_{d2} = 56.49$ |
| $r_4 = 56.9294$ | $d_4 =$ (Variable) | | |
| $r_5 = -99.7376$ | $d_5 = 0.7000$ | $n_{d3} = 1.69680$ | $\nu_{d3} = 56.49$ |
| $r_6 = 6.6025$ | $d_6 = 1.0326$ | | |
| $r_7 = 626.0198$ | $d_7 = 0.8000$ | $n_{d4} = 1.61700$ | $\nu_{d4} = 62.79$ |
| $r_8 = 17.1099$ | $d_8 =$ (Variable) | | |
| $r_9 = 9.3804$ | $d_9 = 1.4983$ | $n_{d5} = 1.84666$ | $\nu_{d5} = 23.78$ |
| $r_{10} = 13.3334$ | $d_{10} =$ (Variable) | | |
| $r_{11} = \infty$ (Stop) | $d_{11} = 0.7700$ | | |
| $r_{12} = 4.1537$ (Aspheric) | $d_{12} = 2.2702$ | $n_{d6} = 1.72000$ | $\nu_{d6} = 50.25$ |
| $r_{13} = 113.1031$ | $d_{13} = 0.2724$ | | |
| $r_{14} = 5.4183$ | $d_{14} = 0.5719$ | $n_{d7} = 1.80518$ | $\nu_{d7} = 25.43$ |
| $r_{15} = 2.5210$ (Aspheric) | $d_{15} = 0.4401$ | | |
| $r_{16} = 3.5815$ | $d_{16} = 1.4942$ | $n_{d8} = 1.69350$ | $\nu_{d8} = 53.23$ |
| $r_{17} = 5.3748$ | $d_{17} = 2.0539$ | | |
| $r_{18} = \infty$ | $d_{18} = 1.2000$ | $n_{d9} = 1.51633$ | $\nu_{d9} = 64.15$ |
| $r_{19} = \infty$ | $d_{19} = 3.3000$ | $n_{d10} = 1.54771$ | $\nu_{d10} = 62.83$ |
| $r_{20} = \infty$ | $d_{20} = 0.3750$ | | |
| $r_{21} = \infty$ | $d_{21} = 0.4500$ | $n_{d11} = 1.51633$ | $\nu_{d11} = 64.15$ |
| $r_{22} = \infty$ | | | |

Zooming Specs

| f | 7.73 | 12.3 | 19.65 |
|---|---|---|---|
| $d_4$ | 0.763 | 5.233 | 8.740 |
| $d_8$ | 0.800 | 2.050 | 0.804 |
| $d_{10}$ | 8.880 | 3.161 | 0.900 |

Aspherical Coefficients
12th surface
$P = 1$
$A_4 = -0.78146 \times 10^{-3}$
$A_6 = -0.42378 \times 10^{-4}$
$A_8 = -0.68941 \times 10^{-5}$
15th surface
$P = 1$
$A_4 = 0.21788 \times 10^{-3}$
$A_6 = 0.21953 \times 10^{-3}$
$A_8 = -0.15642 \times 10^{-3}$ Example 10
$f = 10.3 \sim 16.5 \sim 26.2$
$F_{NO} = 2.70 \sim 2.70 \sim 2.70$
$\omega = 22.2 \sim 14.3 \sim 9.1°$

| | | | |
|---|---|---|---|
| $r_1 = 17.6881$ | $d_1 = 0.9000$ | $n_{d1} = 1.84666$ | $\nu_{d1} = 23.78$ |
| $r_2 = 12.6763$ | $d_2 = 0.1000$ | | |
| $r_3 = 13.0173$ | $d_3 = 3.9946$ | $n_{d2} = 1.69680$ | $\nu_{d2} = 56.49$ |
| $r_4 = 171.4669$ | $d_4 =$ (Variable) | | |
| $r_5 = -104.8190$ | $d_5 = 0.7000$ | $n_{d3} = 1.69680$ | $\nu_{d3} = 56.49$ |
| $r_6 = 9.5107$ | $d_6 = 1.3789$ | | |
| $r_7 = -27.6040$ | $d_7 = 0.7000$ | $n_{d4} = 1.61700$ | $\nu_{d4} = 62.79$ |
| $r_8 = 29.8089$ | $d_8 =$ (Variable) | | |
| $r_9 = 21.0985$ | $d_9 = 1.3747$ | $n_{d5} = 1.84666$ | $\nu_{d5} = 23.78$ |
| $r_{10} = 64.3709$ | $d_{10} =$ (Variable) | | |
| $r_{11} = \infty$ (Stop) | $d_{11} = 0.9000$ | | |
| $r_{12} = 4.9976$ (Aspheric) | $d_{12} = 3.6797$ | $n_{d6} = 1.72000$ | $\nu_{d6} = 50.25$ |
| $r_{13} = 813.6221$ | $d_{13} = 0.0420$ | | |
| $r_{14} = 13.1466$ | $d_{14} = 0.7000$ | $n_{d7} = 1.80518$ | $\nu_{d7} = 25.43$ |
| $r_{15} = 3.4291$ (Aspheric) | $d_{15} = 0.6365$ | | |
| $r_{16} = 4.7753$ | $d_{16} = 2.1761$ | $n_{d8} = 1.69350$ | $\nu_{d8} = 53.23$ |
| $r_{17} = 10.4880$ | $d_{17} = 3.5862$ | | |
| $r_{18} = \infty$ | $d_{18} = 1.6000$ | $n_{d9} = 1.51633$ | $\nu_{d9} = 64.15$ |
| $r_{19} = \infty$ | $d_{19} = 4.4000$ | $n_{d10} = 1.54771$ | $\nu_{d10} = 62.83$ |
| $r_{20} = \infty$ | $d_{20} = 0.5000$ | | |
| $r_{21} = \infty$ | $d_{21} = 0.6000$ | $n_{d11} = 1.51633$ | $\nu_{d11} = 64.15$ |
| $r_{22} = \infty$ | | | |

Zooming Specs

| f | 10.3 | 16.5 | 26.2 |
|---|---|---|---|
| $d_4$ | 1.017 | 6.709 | 11.121 |
| $d_8$ | 0.800 | 2.084 | 0.800 |
| $d_{10}$ | 11.304 | 4.328 | 1.200 |

Aspherical Coefficients
12th surface
$P = 1$
$A_4 = -0.34141 \times 10^{-3}$
$A_6 = -0.92413 \times 10^{-5}$
$A_8 = -0.13878 \times 10^{-5}$ -continued 15th surface
$P = 1$
$A_4 = 0.73911 \times 10^{-3}$
$A_6 = 0.88666 \times 10^{-4}$
$A_8 = -0.10889 \times 10^{-4}$ Example 11
$f = 7.73 \sim 12.3 \sim 19.65$
$F_{NO} = 2.70 \sim 2.70 \sim 2.70$
$\omega = 22.2 \sim 14.3 \sim 8.8°$

| | | | |
|---|---|---|---|
| $r_1 = 17.7946$ | $d_1 = 1.4097$ | $n_{d1} = 1.84666$ | $v_{d1} = 23.78$ |
| $r_2 = 11.6530$ | $d_2 = 0.1743$ | | |
| $r_3 = 11.8216$ | $d_3 = 3.4004$ | $n_{d2} = 1.69680$ | $v_{d2} = 56.49$ |
| $r_4 = -245.1207$ | $d_4 =$ (Variable) | | |
| $r_5 = -22.2084$ | $d_5 = 1.0000$ | $n_{d3} = 1.69680$ | $v_{d3} = 56.49$ |
| $r_6 = 5.8519$ (Aspheric) | $d_6 =$ (Variable) | | |
| $r_7 = 7.5964$ | $d_7 = 1.4000$ | $n_{d4} = 1.84666$ | $v_{d4} = 23.78$ |
| $r_8 = 11.0167$ | $d_8 =$ (Variable) | | |
| $r_9 = \infty$ (Stop) | $d_9 = 0.8000$ | | |
| $r_{10} = 4.5276$ (Aspheric) | $d_{10} = 2.3284$ | $n_{d6} = 1.72000$ | $v_{d6} = 50.25$ |
| $r_{11} = 45.3703$ | $d_{11} = 1.2323$ | | |
| $r_{12} = 24.9582$ | $d_{12} = 0.8000$ | $n_{d7} = 1.80518$ | $v_{d7} = 25.43$ |
| $r_{13} = 3.6293$ | $d_{13} = 1.0400$ | | |
| $r_{14} = 4.5482$ | $d_{14} = 2.1063$ | $n_{d8} = 1.69350$ | $v_{d8} = 53.23$ |
| $r_{15} = 115.0989$ (Aspheric) | $d_{15} = 1.9839$ | | |
| $r_{16} = \infty$ | $d_{16} = 1.2000$ | $n_{d8} = 1.51633$ | $v_{d8} = 64.15$ |
| $r_{17} = \infty$ | $d_{17} = 3.3000$ | $n_{d9} = 1.54771$ | $v_{d9} = 62.83$ |
| $r_{18} = \infty$ | $d_{18} = 0.3750$ | | |
| $r_{19} = \infty$ | $d_{19} = 0.4500$ | $n_{d10} = 1.51633$ | $v_{d10} = 64.15$ |
| $r_{20} = \infty$ | | | |

Zooming Speces

| f | 7.73 | 12.3 | 19.65 |
|---|---|---|---|
| $d_4$ | 0.763 | 5.477 | 9.277 |
| $d_6$ | 0.973 | 1.915 | 0.973 |
| $d_8$ | 9.264 | 3.608 | 0.750 |

Aspherical Coefficients
6th surface
$P = 1$
$A_4 = -0.23998 \times 10^{-3}$
$A_6 = -0.29906 \times 10^{-4}$
$A_8 = 0.41548 \times 10^{-6}$
10th surface
$P = 1$
$A_4 = -0.76945 \times 10^{-3}$
$A_6 = 0.59072 \times 10^{-4}$
$A_8 = -0.11708 \times 10^{-4}$
15th surface
$P = 1$
$A_4 = 0.14822 \times 10^{-2}$
$A_6 = 0.20025 \times 10^{-3}$
$A_8 = -0.12005 \times 10^{-5}$ Example 12
$f = 7.73 \sim 12.3 \sim 19.65$
$F_{NO} = 2.70 \sim 2.70 \sim 2.70$
$\omega = 22.2 \sim 14.3 \sim 8.8°$

| | | | |
|---|---|---|---|
| $r_1 = 13.9767$ | $d_1 = 0.9000$ | $n_{d1} = 1.84666$ | $v_{d1} = 23.78$ |
| $r_2 = 9.7971$ | $d_2 = 0.2000$ | | |
| $r_3 = 10.0438$ | $d_3 = 4.1835$ | $n_{d2} = 1.69680$ | $v_{d2} = 56.49$ |
| $r_4 = 227.2647$ | $d_4 =$ (Variable) | | |
| $r_5 = 209.6798$ | $d_5 = 0.7000$ | $n_{d3} = 1.69680$ | $v_{d3} = 56.49$ |
| $r_6 = 8.7851$ | $d_6 = 1.2060$ | | |
| $r_7 = -13.6756$ | $d_7 = 0.7000$ | $n_{d4} = 1.61700$ | $v_{d4} = 62.79$ |
| $r_8 = 12.3656$ | $d_8 =$ (Variable) | | |
| $r_9 = 201.0213$ | $d_9 = 1.4000$ | $n_{d5} = 1.84666$ | $v_{d5} = 23.78$ |
| $r_{10} = -28.0333$ | $d_{10} =$ (Variable) | | |
| $r_{11} = \infty$ (Stop) | $d_{11} = 0.9000$ | | |
| $r_{12} = 4.7487$ (Aspheric) | $d_{12} = 2.4714$ | $n_{d6} = 1.72000$ | $v_{d6} = 50.25$ |
| $r_{13} = -49.1209$ | $d_{13} = 0.9307$ | | |
| $r_{14} = 13.8198$ | $d_{14} = 0.8000$ | $n_{d7} = 1.80518$ | $v_{d7} = 25.43$ |
| $r_{15} = 3.0082$ | $d_{15} = 0.4048$ | | |
| $r_{16} = 4.1855$ (Aspheric) | $d_{16} = 2.7000$ | $n_{d8} = 1.69350$ | $v_{d8} = 53.23$ |
| $r_{17} = 18.5593$ | $d_{17} = 1.4745$ | | |
| $r_{18} = \infty$ | $d_{18} = 1.2000$ | $n_{d9} = 1.51633$ | $v_{d9} = 64.15$ |
| $r_{19} = \infty$ | $d_{19} = 3.3000$ | $n_{d10} = 1.54771$ | $v_{d10} = 62.83$ |
| $r_{20} = \infty$ | $d_{20} = 0.3750$ | | |
| $r_{21} = \infty$ | $d_{21} = 0.4500$ | $n_{d11} = 1.51633$ | $v_{d11} = 64.15$ |
| $r_{22} = \infty$ | | | |

Zooming Speces

| f | 7.73 | 12.3 | 19.65 |
|---|---|---|---|
| $d_4$ | 0.763 | 4.869 | 7.994 |
| $d_8$ | 0.800 | 1.750 | 0.800 |
| $d_{10}$ | 7.981 | 2.925 | 0.750 |

Aspherical Coefficients

-continued

12th surface
P = 1
$A_4 = -0.69150 \times 10^{-3}$
$A_6 = -0.36397 \times 10^{-4}$
$A_8 = -0.70931 \times 10^{-6}$
16th surface
P = 1
$A_4 = -0.34372 \times 10^{-3}$
$A_6 = 0.56876 \times 10^{-5}$
$A_8 = 0.18989 \times 10^{-4}$ Example 13
f = 7.73~12.3~19.65
$F_{NO}$ = 2.59~2.58~2.58
ω = 22.2~14.3~8.8°

| | | | |
|---|---|---|---|
| $r_1$ = 12.3158 | $d_1$ = 0.9005 | $n_{d1}$ = 1.84666 | $v_{d1}$ = 23.78 |
| $r_2$ = 9.0397 | $d_2$ = 0.1700 | | |
| $r_3$ = 9.2519 | $d_3$ = 3.7000 | $n_{d2}$ = 1.69680 | $v_{d2}$ = 56.49 |
| $r_4$ = 38.9675 | $d_4$ = (Variable) | | |
| $r_5$ = 85162.0655 | $d_5$ = 0.7000 | $n_{d3}$ = 1.69680 | $v_{d3}$ = 56.49 |
| $r_6$ = 6.3798 | $d_6$ = 0.8452 | | |
| $r_7$ = 19.3149 | $d_7$ = 08000 | $n_{d4}$ = 1.61700 | $v_{d4}$ = 62.79 |
| $r_8$ = 9.3413 | $d_8$ = (Variable) | | |
| $r_9$ = 7.5749 | $d_9$ = 1.5007 | $n_{d5}$ = 1.84666 | $v_{d5}$ = 23.78 |
| $r_{10}$ = 9.8823 | $d_{10}$ = (Variable) | | |
| $r_{11}$ = ∞ (Stop) | $d_{11}$ = 0.7700 | | |
| $r_{12}$ = 4.3403 (Aspheric) | $d_{12}$ = 2.7650 | $n_{d6}$ = 1.72000 | $v_{d6}$ = 50.25 |
| $r_{13}$ = -50.8174 | $d_{13}$ = 0.0300 | | |
| $r_{14}$ = 6.2689 | $d_{14}$ = 0.6121 | $n_{d7}$ = 1.80518 | $v_{d7}$ = 25.43 |
| $r_{15}$ = 2.5304 (Aspheric) | $d_{15}$ = 0.3160 | | |
| $r_{16}$ = 3.2764 | $d_{16}$ = 1.8000 | $n_{d8}$ = 1.69350 | $v_{d8}$ = 53.23 |
| $r_{17}$ = 4.7721 | $d_{17}$ = 1.3698 | | |
| $r_{18}$ = ∞ | $d_{18}$ = 1.2000 | $n_{d9}$ = 1.51633 | $v_{d9}$ = 64.15 |
| $r_{19}$ = ∞ | $d_{19}$ = 3.3000 | $n_{d10}$ = 1.54771 | $v_{d10}$ = 62.83 |
| $r_{20}$ = ∞ | $d_{20}$ = 0.3750 | | |
| $r_{21}$ = ∞ | $d_{21}$ = 0.4500 | $n_{d11}$ = 1.51633 | $v_{d11}$ = 64.15 |
| $r_{22}$ = ∞ | | | |

Zooming Specs

| f | 7.73 | 12.3 | 19.65 |
|---|---|---|---|
| $d_4$ | 0.763 | 5.363 | 9.032 |
| $d_8$ | 0.800 | 2.004 | 0.804 |
| $d_{10}$ | 9.172 | 3.369 | 0.900 |

Aspherical Coefficients
12th surface
P = 1
$A_4 = -0.78146 \times 10^{-3}$
$A_6 = -0.42378 \times 10^{-4}$
$A_8 = -0.68941 \times 10^{-5}$
15th surface
P = 1
$A_4 = 0.21788 \times 10^{-3}$
$A_6 = 0.21953 \times 10^{-3}$
$A_8 = -0.15642 \times 10^{-3}$ The aberration curve diagrams of Examples 1-13 at the wide angle ends (W), standard settings (S) and telephone ends (T) are shown in FIGS. 8-20.

Set out below are the values of Examples 1-13 corresponding the above conditions (1) to (7).

TABLE

| | (1) | (2) | (3) | (4) | (5) | (6) | (7) |
|---|---|---|---|---|---|---|---|
| Ex. 1 | 0.49 | | 0.99 | -1.52 | -1.97 | | 2.47 |
| 2 | 0.43 | | 0.91 | -1.58 | -1.85 | | 2.72 |
| 3 | 0.48 | | 0.94 | -1.71 | -1.28 | | 2.50 |
| 4 | 0.36 | | 0.69 | -1.65 | -1.39 | | 3.06 |
| 5 | 0.15 | | 0.85 | -1 | -1.75 | | 2.77 |
| 6 | 0.60 | | 0.91 | -2.07 | -2.1 | | 2.59 |
| 7 | 1.26 | | 1.1 | -1.84 | -2.92 | | 2.76 |
| 8 | | 0.98 | 0.78 | | | 2.03 | 3.03 |
| 9 | | 0.96 | 0.65 | | | 2.74 | 4.11 |
| 10 | | 0.96 | 0.70 | | | 1.71 | 3.51 |
| 11 | | 1.08 | 0.97 | | | 1.34 | 3.15 |
| 12 | | 1.00 | 0.95 | | | 1.56 | 3.78 |
| 13 | | 0.93 | 0.72 | | | 2.74 | 3.74 |

As will be clearly understood from the foregoing, this invention provides a zoom lens system having a field angle of about 44° to 48° at the wide angle end, a variable power ratio of about 2.6 to 3 and an F-number on the order of 2.8, which can be not only much reduced in the total length while making sure of a long back focus but constructed with a reduced number of, say, 7 or 8, lenses as well.

What is claimed is:

1. A zoom lens system consisting of, in order from the object side, a first lens group having a positive refractive power, a second lens group having a negative refractive power, a third lens group having a positive refractive power and a fourth lens group consisting of three lens elements and having a positive refractive power as a whole, said second and third lens groups being moved in zooming, thereby effecting variable power and said zoom lens system satisfying the following condition (1):

$$0.1 < (r_{4IF} + r_{4IR})/(r_{4IF} - r_{4IR}) < 3.0 \qquad (1)$$

wherein $r_{4IF}$ is the radius of curvature of a front surface of the lens in the fourth lens group that is proximate to the object side and $r_{4IR}$ is the radius of curvature of a rear surface of the lens in the fourth lens group that is proximate to the object side;

wherein said first lens group is fixed for zooming.

2. A zoom lens system consisting of, in order from the object side, a first lens group having a positive refractive power, a second lens group having a negative refractive power, a third lens group having a positive refractive power and a fourth lens group consisting of three lens elements and having a positive refractive power as a whole, said second and third lens groups being moved in zooming, thereby effecting variable power and a zoom lens system satisfying the following condition (2):

$$0.5 < f_{IV}/f_W < 1.2 \qquad (2)$$

wherein $f_{IV}$ is the focal length of the fourth lens group and $f_W$ is the focal length of the total system at the wide angle end; wherein the first lens group remains fixed for zooming.

3. A zoom lens system consisting of, in order from the object side, a first lens group having a positive refractive power, a second lens group having a negative refractive power, a third lens group having a positive refractive power and a fourth lens group consisting of three lens elements and having a positive refractive power as a whole, said second and third lens groups being moved in zooming, thereby effecting variable power and said zoom lens system satisfying the following condition (3):

$$0.4 < \Sigma d_{IV}/f_W < 1.12 \qquad (3)$$

wherein $\Sigma d_{IV}$ is the total thickness of the fourth lens group from a first surface thereof to a final surface thereof, and $f_W$ is the focal length of the total system at the wide angle end;

wherein said first lens group remains fixed for zooming.

4. A zoom lens system as claimed in claim 1 or 3, further satisfying the following condition (4):

$$-2.5 < (r_{42F} + r_{42R})/(r_{42F} - r_{42R}) < -0.5 \qquad (4)$$

wherein $r_{42F}$ is the radius of curvature of the front surface of the lens lying intermediate in the fourth lens group, and $r_{42R}$ is the radius of curvature of the rear surface of the lens lying intermediate in the fourth lens group.

5. A zoom lens system as claimed in claim 4, further satisfying the following condition (5):

$$-5 < (r_{31F} + r_{31R})/(r_{31F} - r_{31R}) < 31 \ 1.1 \qquad (5)$$

wherein $r_{31F}$ is the radius of curvature of the surface of the third lens group that lies on the object side and $r_{31R}$ is the radius of curvature of the surface of the third lens group that lies on the image side.

6. A zoom lens system as claimed in claim 5, further satisfying the following condition (7):

$$2.4 < f_{III}/f_W < 4.15 \qquad (7)$$

wherein $f_{III}$ is the focal length of the third lens group and $f_W$ is the focal length of the total system at the wide angle end.

7. A zoom lens system as claimed in claim 6, wherein the three lens elements forming said fourth lens group are made up of, in order from the object side, a positive lens, a negative lens and a positive lens.

8. A zoom lens system as claimed in claim 5, wherein the three lens elements forming said fourth lens group are made up of, in order from the object side, a positive lens, a negative lens and a positive lens.

9. A zoom lens system as claimed in claim 4, further satisfying the following condition (6):

$$1 < (r_{42F} + r_{42R})/(r_{42F} - r_{42R}) < 5 \qquad (6)$$

wherein $r_{42F}$ is the radius of curvature of the front surface of the lens lying intermediate in the fourth lens group, and $r_{42R}$ is the radius of curvature of the rear surface of the lens lying intermediate in the fourth lens group.

10. A zoom lens system as claimed in claim 9, further satisfying the following condition (7):

$$2.4 < f_{III}/f_W < 4.15 \qquad (7)$$

wherein $f_{III}$ is the focal length of the third lens group and $f_W$ is the focal length of the total system at the wide angle end.

11. A zoom lens system as claimed in claim 10, wherein the three lens elements forming said fourth lens group are made up of, in order from the object side, a positive lens, a negative lens and a positive lens.

12. A zoom lens system as claimed in claim 9, wherein the three lens elements forming said fourth lens group are made up of, in order from the object side, a positive lens, a negative lens and a positive lens.

13. A zoom lens system as claimed in claim 4, further satisfying the following condition (7):

$$2.4 < f_{III}/f_W < 4.15 \qquad (7)$$

wherein $f_{III}$ is the focal length of the third lens group and $f_W$ is the focal length of the total system at the wide angle end.

14. A zoom lens system as claimed in claim 13, wherein the three lens elements forming said fourth lens group are made up of, in order from the object side, a positive lens, a negative lens and a positive lens.

15. A zoom lens system as claimed in claim 4, wherein the three lens elements forming said fourth lens group are made up of, in order from the object side, a positive lens, a negative lens and a positive lens.

16. A zoom lens system as claimed in claim 1 or 3, further satisfying the following condition (5):

$$-5 < (r_{31F} + r_{31R})/(r_{31F} - r_{31R}) < -1.1 \qquad (5)$$

wherein $r_{31F}$ is the radius of curvature of the surface of the third lens group that lies on the object side and $r_{31R}$ is the radius of curvature of the surface of the third lens group that lies on the image side.

17. A zoom lens system as claimed in claim 16, further satisfying the following condition (7):

$$2.4 < f_{III}/f_W < 4.15 \qquad (7)$$

wherein $f_{III}$ is the focal length of the third lens group and $f_W$ is the focal length of the total system at the wide angle end.

18. A zoom lens system as claimed in claim 17, wherein the three lens elements forming said fourth lens group are made up of, in order from the object side, a positive lens, a negative lens and a positive lens.

19. A zoom lens system as claimed in claim 16, wherein the three lens elements forming said fourth lens group are made up of, in order from the object side, a positive lens, a negative lens and a positive lens.

20. A zoom lens system as claimed in claim 1, 2 or 3, further satisfying the following condition (7):

$$2.4 < f_{III}/F_W < 4.15 \quad (7)$$

wherein $f_{III}$ is the focal length of the third lens group and $f_W$ is the focal length of the total system at the wide angle end.

21. A zoom lens system as claimed in claim 20, wherein the three lens elements forming said fourth lens group are made up of, in order from the object side, a positive lens, a negative lens and a positive lens.

22. A zoom lens system as claimed in claim 1, 2 or 3, wherein the three lens elements forming said fourth lens group are made up of, in order from the object side, a positive lens, a negative lens and a positive lens.

* * * * *